United States Patent
Rosenboom et al.

(10) Patent No.: US 12,454,967 B2
(45) Date of Patent: Oct. 28, 2025

(54) MULTI-STAGE, TELESCOPING HYDRAULIC CYLINDER, CYLINDER BEARING PROTECTION SYSTEM, AND SCRAPER FOR CYLINDER ROD

(71) Applicant: Rosenboom Machine & Tool, Inc., Sheldon, IA (US)

(72) Inventors: Darin M. Rosenboom, Sheldon, IA (US); Ryan L. Bolkema, Sheldon, IA (US)

(73) Assignee: Rosenboom Machine & Tool, Inc., Sheldon, IA (US)

( * ) Notice: Subject to any disclaimer, the term of this patent is extended or adjusted under 35 U.S.C. 154(b) by 0 days.

(21) Appl. No.: 18/317,405

(22) Filed: May 15, 2023

(65) Prior Publication Data

US 2023/0366414 A1    Nov. 16, 2023

Related U.S. Application Data

(60) Provisional application No. 63/364,694, filed on May 13, 2022.

(51) Int. Cl.
| | |
|---|---|
| *F15B 15/14* | (2006.01) |
| *F15B 15/16* | (2006.01) |
| *F16C 35/02* | (2006.01) |

(52) U.S. Cl.
CPC ...... *F15B 15/1438* (2013.01); *F15B 15/1433* (2013.01); *F15B 15/1457* (2013.01); *F15B 15/16* (2013.01); *F16C 35/02* (2013.01); *F16C 2361/00* (2013.01)

(58) Field of Classification Search
CPC .... F15B 15/1438; F15B 15/16; F16C 23/045; F16C 11/0614; F16C 33/74
See application file for complete search history.

(56) References Cited

U.S. PATENT DOCUMENTS

| | | | | |
|---|---|---|---|---|
| 3,556,674 | A | * 1/1971 | Foote | B64C 27/54 416/168 R |
| 4,105,365 | A | * 8/1978 | Ferris | B64C 27/51 416/107 |
| 7,651,274 | B2 | * 1/2010 | Yamamoto | F16C 33/74 384/473 |
| 9,221,475 | B2 | * 12/2015 | Voisine | F16C 23/045 |
| 9,958,013 | B2 | * 5/2018 | Hervieux | F16C 35/02 |
| 10,487,878 | B2 | * 11/2019 | Voisine | F16C 23/043 |

(Continued)

*Primary Examiner* — Dustin T Nguyen
(74) *Attorney, Agent, or Firm* — McKee, Voorhees & Sease, PLC

(57) ABSTRACT

Hydraulic cylinders include a number of features that are useful in a number of industries. The great advantage telescopic cylinders have over any other type of cylinders is their ability to provide an exceptionally long stroke from a compact initial package. Controlling the extension and retraction of the stages of a telescoping cylinder mitigates mis-staging, which is an unwanted result of some telescoping cylinders. Spherical bearings at the end mount of cylinders, either telescoping or not, can be cleaned using scrapers, which will extend the life of the bearings in the field. The rods of cylinders, either telescoping or not, can also be cleaned with additional scrapers at key locations to further remove unwanted and potentially damaging material that can build up on the rods, such as due to the environment of use for the cylinders.

18 Claims, 30 Drawing Sheets

(56) References Cited

U.S. PATENT DOCUMENTS

| | | | |
|---|---|---|---|
| 10,598,219 B2* | 3/2020 | Voisine | F16C 33/76 |
| 11,105,375 B2* | 8/2021 | Unger | F16C 23/084 |
| 2008/0247690 A1* | 10/2008 | James | B64C 27/59 |
| | | | 416/134 A |
| 2013/0045040 A1* | 2/2013 | Ginn | B62D 55/0842 |
| | | | 403/26 |
| 2022/0074447 A1* | 3/2022 | Schoenholtz | F16C 33/205 |
| 2022/0397128 A1* | 12/2022 | Bueter | F16J 10/02 |

\* cited by examiner

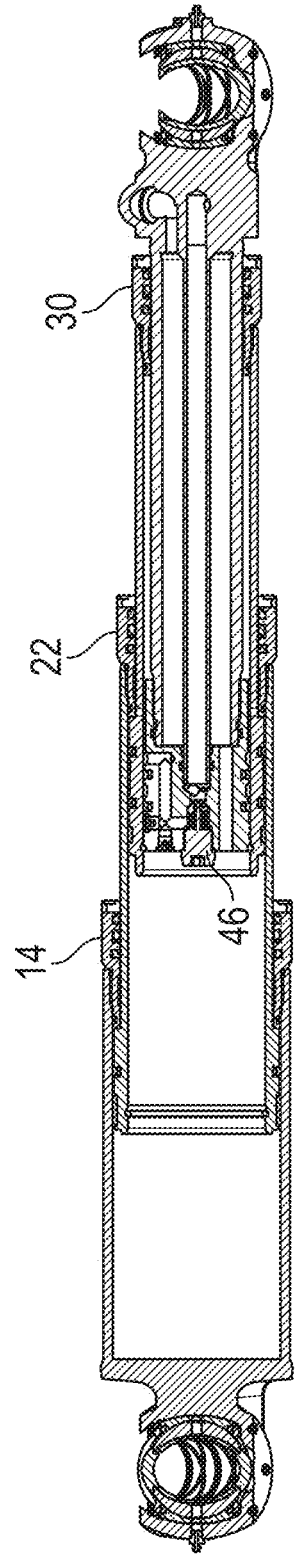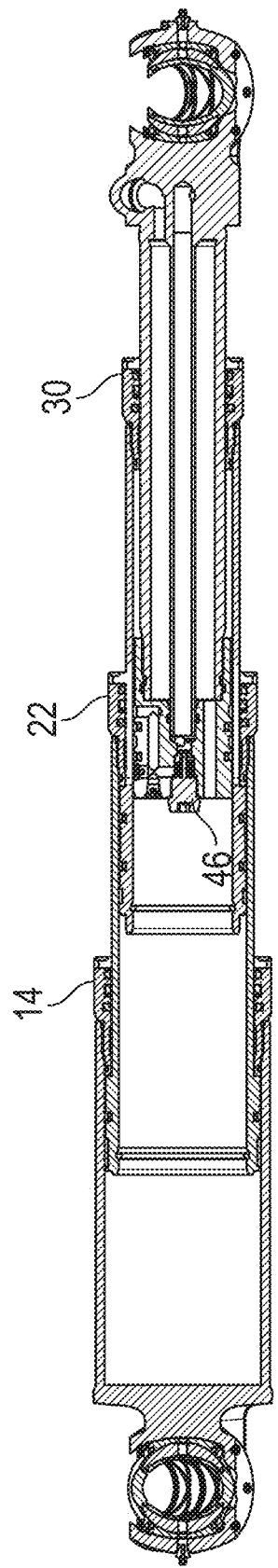
FIG. 13A
FIG. 13B

MULTI-STAGE, TELESCOPING HYDRAULIC CYLINDER, CYLINDER BEARING PROTECTION SYSTEM, AND SCRAPER FOR CYLINDER ROD

CROSS REFERENCE TO RELATED APPLICATIONS

This application claims priority under 35 U.S.C. § 119 to provisional patent application U.S. Ser. No. 63/364,694, filed May 13, 2022. The provisional patent application is herein incorporated by reference in its entirety, including without limitation, the specification, claims, and abstract, as well as any figures, tables, appendices, or drawings thereof.

FIELD OF THE INVENTION

The invention relates generally to hydraulic cylinders. More particularly, but not exclusively, the invention relates to telescoping hydraulic cylinders with multiple stages, hydraulic cylinder bearing protection systems, and scrapers for all types of hydraulic cylinders to aid in increasing the life of the cylinders.

BACKGROUND OF THE INVENTION

Telescopic hydraulic cylinders feature a series of steel tubes, called stages, which are nested inside each other. Most standard telescopic cylinders feature anywhere from 2 to 5 stages. This design allows for a significantly longer extension stroke than standard hydraulic cylinders. The collapsed length of typical telescopic cylinders varies between 20% to 40% of their extended length. Thus, when mounting space is limited, and the application needs a long stroke, a telescopic cylinder is a logical solution. The extension of the telescoping cylinders makes them ideal for certain industries, such as sanitation and dump trucks. The cylinders are able to extend a greater amount, which allows the packers for sanitation trucks to better pack the refuse held in their body. This also allows dumping of sanitation and other dump trucks, such as by providing increased length to position the housings at ideal angles for unloading of the bodies.

For example, assume a dump body needs to be tilted 60° in order to empty completely. If the body or trailer is fitted with a conventional rod-type cylinder with a one-piece barrel and stroke long enough to attain that angle the dump body could not return to a horizontal orientation for highway travel because of the cylinder's length, even when fully retracted. A telescopic cylinder easily solves this problem.

Once the hydraulic system introduces pressure, the largest sleeve or tube moves first, then the next largest, down to the smallest sleeve or plunger. The largest diameter section is called the main or barrel; the smaller-diameter sections that move are called stages; the smallest stage is also called the plunger. When retracting the cylinder, the smallest sleeve or plunger closes or collapses first, then the next largest sleeve, up to the largest sleeve.

The cylinders can be single-acting or double-acting. Double-acting telescopic cylinders are powered hydraulically in both directions. They can be used in applications where neither gravity nor external force can retract the cylinder. They are well suited to non-critical positioning applications requiring extension and retraction movement of a substantial load. A classic application is the packer-ejector cylinder in refuse vehicles and transfer trailers. The horizontally mounted cylinder pushes a platen to compress the load, then must retract with the platen so more material can be added.

Extension of the telescoping cylinders is provided by the hydraulic oil being applied to all of the stages of the cylinder. As the larger first stage has a larger surface area, it will extend before the next largest stage until all stages are extended. Retraction of double-acting telescopic cylinders is made possible by sealing each moving stage's piston area outside diameter with the next larger stage's inside diameter and building internal oil-transfer holes into each moving stage. The oil-transfer holes are located just above the pistons in the body of the stage. The retraction port normally is located in the top of the smallest stage. Oil flows through this port and into the smallest stage. The oil transfer hole allows oil to enter and pressurize the volume between the next stages internal diameter and the smaller stages outer diameter. Pressure in this volume generates the force to move or retract the smaller stage into the larger stage. Once this stage is fully retracted, the oil-transfer hole in the next larger stage is exposed to allow oil flow for it to retract. This retraction process continues automatically until all stages have retracted into the main. The seal on each stage selects the areas against which pressure will work.

However, telescoping hydraulic cylinders have been known to miss stages, which is referred to as mis-staging, which occurs when the cylinder does not extend or retract in the correct sequence. For example, a typical mis-staging with a 3-stage cylinder can look like the following: the largest sleeve extends properly, but the plunger starts extending before the middle (or next larger) sleeve starts to extend. The middle sleeve finally breaks loose and shoots out, causing it and the plunger to collapse or drop back into the cylinder. This creates a loud banging noise as the cylinder slams down. The mis-staging often occurs when telescoping cylinders are used in situations where the first stage needs to extend under very low load induced pressure.

Therefore, there is a need in the art for improvements to telescoping hydraulic cylinders to aid in the extension and retraction of the cylinder stages that mitigate mis-staging of the cylinders.

As noted, the cylinders are often used with trucks, such as dump trucks or sanitation trucks, which are otherwise known as refuse vehicles. The cylinders on a single vehicle may include a combination of telescoping and non-telescoping cylinders, which include a single rod and piston moving in a tube. At an end of the tube is an end mount that includes a bearing and that is used to mount the cylinder to the vehicle. The bearing allows some rotation of an end of the cylinder relative to the vehicle, which may be required during the extension and retraction of the cylinder, so as to provide the extension while not taking up much needed room in the vehicle.

Many types of bearings are used in pinned connections. Two examples are spherical bearings and sleeve bushing/journal bearings. Spherical bearings are often desirable in applications where there is misalignment in the joint such as a hydraulic cylinder that the mounts of the base end and rod end are not aligned perfectly. These bearings allow for complete rotation in the pin axis direction as well as articulation perpendicular to the pin a few degrees. In very dirty environments, spherical bearings can be easily damaged due to debris pushing into the ball and race area. Some dirty applications will avoid the use of spherical bearings because of this limitation. In many cases a sleeve bushing is used as it does not allow debris to damage it as easily. However, these sleeve bushings do not allow for the additional articulation perpendicular to the pin which can put additional strain on the cylinder and mounts. Sleeve bushings can also be installed in housing that have various widths allowing for more flexibility in mount widths.

Still further, the types of spherical bearings described herein are typically pressed into a housing with a mechanical or hydraulic press using several tons of force. This makes it extremely difficult to service, especially when in use. Taking a cylinder out of use for the time needed to repair is unwanted and could be detrimental to the equipment.

There exists a need to improve on the end mounts with bearings to increase the life of the bearings and to make it easier to replace the bearings when they become less ideal for use with the cylinders.

As noted, cylinders of the type described are often used in refuse equipment, but they can also be used in the logging industry or road construction. The environment for the cylinders may include sticky materials that can adhere to the cylinder rods. Metallic scrapers are known to interact with the moving rods to attempt to protect the rod seals from damage from debris. These are used on the outside of the cylinder in front of the cylinder wiper and rod seals to prevent the debris from coming into the cylinder. However, in the case of very sticky substances, these scrapers cannot always remove all of the material and the stuck material will cycle in and out of the cylinder, damaging seals. One characteristic that is common with these sticky materials is they will often soften while soaking in hydraulic oil when the cylinder is allowed to stay retracted for a period of time. When the materials are softened, then when the cylinder is extended, the material can be scraped off by the rod seals and embed in the seals and seal grooves. This damages the seals and reduces the life.

Thus, there exists a need in the art to provide an improved cylinder rod cleaning system that removes more of the sticky substances that become adhered to the rods than is currently being removed.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage to provide a telescoping, hydraulic cylinder with improved control of the extension and retraction of the stages of the cylinder. For example, the stages are moved in a controlled manner to mitigate mis-staging of rods.

It is another object, feature, and/or advantage to increase the amount of force a telescoping cylinder is able to resist without mis-staging.

It is still yet a further object, feature, and/or advantage to include scrapers with spherical bearings at end mounts of a hydraulic cylinder. The scrapers scrape away any debris and mitigate debris from being packed into the ball and race area, thus improving the life of the spherical bearings.

It is still another object, feature, and/or advantage to protect the elastomer seals of the spherical bearings.

It is yet another object, feature, and/or advantage to provide spherical bearings that can be more easily installed and/or field serviced, such as without a press.

It is still a further object, feature, and/or advantage to include an improved cylinder rod cleaning system and/or apparatus that includes additional scrapers to attempt to remove additional sticky material from the rod.

The hydraulic cylinder, bearing assemblies, and cleaning apparatus disclosed herein can be used in a wide variety of applications. For example, any of the embodiments and/or aspects disclosed herein can be used for any purpose, including, but not limited to refuse vehicles, logging equipment, road construction equipment, dump trucks, or the like. In addition, it should be appreciated that any of the embodiments and/or aspects provided can be combined in any manner with another embodiment or aspect to result in additional embodiments that may not be expressly disclosed herein. The resulting embodiments and/or aspects are to be considered a part of the disclosure.

It is preferred the embodiments and/or aspects provided herein be safe, cost effective, and durable.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

Methods can be practiced which facilitate use, manufacture, assembly, maintenance, and repair of a telescoping cylinder, spherical bearing end mount, or scraper assembly, which accomplish some or all of the previously stated objectives.

The telescoping cylinder, spherical bearing end mount, or scraper assembly can be incorporated into systems or kits which accomplish some or all of the previously stated objectives.

According to some aspects of the present disclosure, a telescoping, hydraulic cylinder comprises a plurality of stages of the cylinder each comprising a rod and piston extending sequentially. said plurality of stages comprising at least a first and a second stage; wherein each of the plurality of stages share a common hydraulic oil extension path with the common oil acting on each of the pistons of the plurality of stages to extend the rods thereof; and a separate hydraulic oil retraction path, said hydraulic oil retraction path comprising a valve in line with the second stage; wherein extension of the second stage is mitigated until a pressure at the valve in the retract path is overcome during extension of the plurality of stages.

According to at least some aspects of some embodiments, the plurality of stages comprises a first stage, a second stage, and a third stage.

According to at least some aspects of some embodiments, the valve of the hydraulic oil retraction path is in line with both the second and third stages.

According to at least some aspects of some embodiments, the valve comprises a relief valve.

According to at least some aspects of some embodiments, the valve comprises a check valve.

According to at least some aspects of some embodiments, the cylinder further comprises an end mount at an end of cylinder.

According to at least some aspects of some embodiments, the end mount comprises a spherical bearing to allow articulated movement.

According to at least some aspects of some embodiments, the cylinder further comprises a scraper associated with the spherical bearing to remove material therefrom.

According to at least some aspects of some embodiments, the cylinder further comprises a scraper assembly associated with the rods of the plurality of stages to remove material therefrom.

According to some aspects of the disclosure, an end mount for use with a hydraulic cylinder, comprises an end mount housing; a bearing member positioned in the housing and connected to the cylinder to allow movement thereof; and at least one scraper positioned between the bearing and the housing to mitigate material building up on the bearing.

According to at least some aspects of some embodiments, the cylinder further comprises a pin operatively connected between the bearing member and the cylinder to provide connection therebetween.

According to at least some aspects of some embodiments, the bearing member comprises a spherical bearing.

According to at least some aspects of some embodiments, the spherical bearing comprises an outer race, and said scraper in communication with said outer race.

According to at least some aspects of some embodiments, the spherical bearing is held in place with a metallic retaining ring and screws.

According to at least some aspects of some embodiments, the at least one scraper comprises first and second scrapers positioned on opposite sides of the spherical bearing.

According to at least some aspects of some embodiments, the cylinder further comprises a second bearing member positioned in the housing, said second bearing member comprising a sleeve bushing interior of the being member.

According to some aspects of the disclosure, a hydraulic cylinder, comprises a cylinder housing; a rod and piston positioned in the cylinder housing; a first metallic scraper outside of the cylinder housing and in contact with at least a portion of the rod to mitigate materials from entering the cylinder housing; and a second metallic scraper in the cylinder housing and in contact with at least a portion of the rod to mitigate material from accumulating on the rod.

According to at least some aspects of some embodiments, the cylinder further comprises a gland assembly in the cylinder housing, and said second metallic scraper inside of a head gland of said gland assembly.

According to at least some aspects of some embodiments, the cylinder further comprises an O-ring adjacent the second metallic scraper to allow at least some movement between the second metallic scraper and the head gland.

According to at least some aspects of some embodiments, the hydraulic cylinder comprises a single stage or multiple stage cylinder.

According to additional aspects of the disclosure, a hydraulic cylinder assembly comprises a telescoping, multi-stage hydraulic cylinder; and an end mount at each end of the telescoping, multi-stage hydraulic cylinder, the end mount comprising, an end mount housing; a bearing member positioned in the housing and connected to the cylinder to allow movement thereof; and at least one scraper positioned between the bearing and the housing to mitigate material building up on the bearing.

According to at least some aspects of some embodiments, the assembly further comprises a pin operatively connected between the bearing member and the cylinder to provide connection therebetween.

According to at least some aspects of some embodiments, the bearing member comprises a spherical bearing.

According to at least some aspects of some embodiments, the spherical bearing comprises an outer race, and said scraper in communication with said outer race.

According to at least some aspects of some embodiments, the at least one scraper comprises first and second scrapers positioned on opposite sides of the spherical bearing.

According to at least some aspects of some embodiments, the telescoping, multi-stage hydraulic cylinder comprises three stages of extension and retraction.

According to at least some aspects of some embodiments, the assembly further comprises a bushing operatively connected to the end mount.

According to additional aspects of the disclosure, a hydraulic cylinder assembly comprises a hydraulic cylinder; and an end mount at each end of the telescoping, multi-stage hydraulic cylinder, the end mount comprising, an end mount housing; a bearing member positioned in the housing and connected to the cylinder to allow movement thereof; at least one scraper positioned between the bearing and the housing to mitigate material building up on the bearing; and a bushing operatively connected to the end mount.

According to at least some aspects of some embodiments, the bearing member comprises a spherical bearing.

According to at least some aspects of some embodiments, the end mount comprises a plurality of scrapers at opposite ends of the bearing member.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

FIGS. 13A-13C are sectional views of a telescoping hydraulic cylinder showing the extension of the stage 3 of the cylinder.

Figure 1:
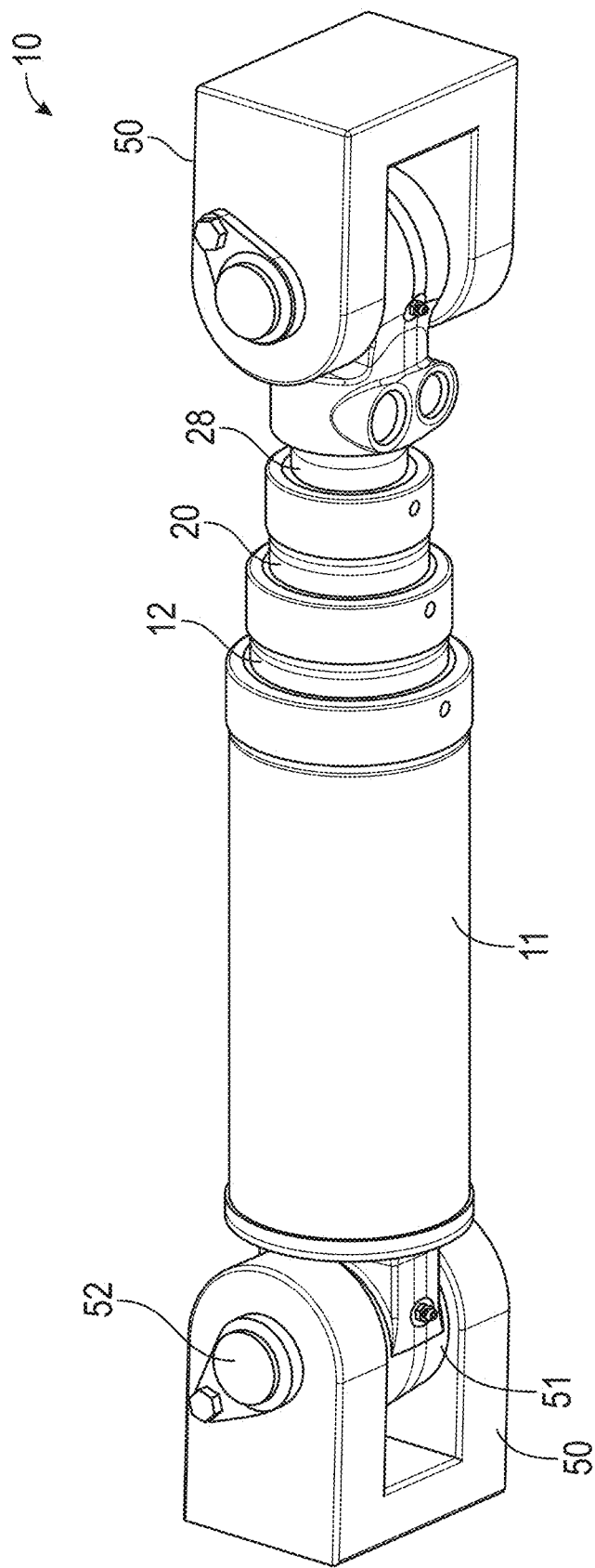
FIG. 1 is an isometric view of a telescoping, hydraulic cylinder, with mounts, according to aspects and/or embodiments of the present disclosure.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

The term(s) "O-ring" describes many different sizes and/or configurations of a mechanical gasket in the shape of a torus; it is a loop of elastomer with a round cross-section, designed to be seated in a groove and compressed during assembly between two or more parts, forming a seal at the interface. The size is not to be limiting.

The term(s) "seal" will have many different varieties based upon the location and/or need for use with the disclosure and is generally a device that helps join systems or mechanisms together by preventing leakage (e.g., in a pumping system), containing pressure, or excluding contamination.

A retaining ring is a fastener that holds components or assemblies onto a shaft or in a housing/bore when installed—typically in a groove. Once installed, the exposed portion acts as a shoulder which retains the specific component or assembly.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

Hydraulic cylinders are used in a wide range and variety of applications. Hydraulic cylinders get their power from pressurized hydraulic fluid, which is typically oil. The hydraulic cylinder consists of a cylinder barrel, in which a piston connected to a piston rod moves back and forth. The barrel is closed on one end by the cylinder bottom (also called the cap) and the other end by the cylinder head (also called the gland) where the piston rod comes out of the cylinder. The piston has sliding rings and seals. The piston divides the inside of the cylinder into two chambers, the bottom chamber (cap end) and the piston rod side chamber (rod end/head-end). For double-acting single-rod cylinders, when the input and output pressures are reversed, there is a force difference between the two sides of the piston due to one side of the piston being covered by the rod attached to it. The cylinder rod reduces the surface area of the piston and reduces the force that can be applied for the retraction stroke.

Hydraulic cylinders can be singular in nature, i.e., a single rod and single piston are used to move a fixed length, as well as telescoping, which provide for greater length. The length of a hydraulic cylinder is the total of the stroke, the thickness of the piston, the thickness of bottom and head and the length of the connections. Often this length does not fit in the machine. In that case the piston rod is also used as a piston barrel and a second piston rod is used. These kinds of cylinders are called telescopic cylinders. If we call a normal rod cylinder single stage, telescopic cylinders are multi-stage units of two, three, four, five, or more stages. In general, telescopic cylinders are much more expensive than normal cylinders.

The present disclosure includes numerous improvements and advantages for both singular and telescoping, double acting, hydraulic cylinders. In addition, many of the improvements and/or advantages could be used with single acting cylinders, and the disclosure is not to be limiting to any particular type of hydraulic cylinder.

As noted in the Background, telescoping cylinders, and hydraulic cylinders in general, can be used in applications including, but not limited to, refuse vehicles, such as for packing and dumping, dump trucks, logging, manufacturing, and the like. Typical applications for double acting telescopic cylinders include the packer-ejector cylinders in garbage trucks/refuse vehicles and transfer trailers, horizontal compactors, telescopic excavator shovels, and roll-on/roll-off trucks. The telescoping cylinders provide an exceptionally long output travel from a very compact retracted length.

FIGS. 1-16 generally disclose a telescoping, hydraulic cylinder 10, which includes a number of features, aspects, and/or embodiments of the present disclosure. As has been included, the cylinder 10 can be used for any number of applications, and the invention is not to be limited to any particular usage and/or environment.

The telescoping cylinder 10 is a double acting hydraulic cylinder, which means that a fluid, e.g., hydraulic oil, is used to both extend and retract the rods of the stages of the cylinder. As shown in the figures, the cylinder 10 includes three stages, with each stage including a rod and piston that are to be sequentially extended and retracted. For example, common usage of the cylinder 10 would include that the first stage 12 extends first, then the second stage 20, and finally the third stage 28 (when needed). However, not all of the stages are always extended for every use, such as when less than the full length of the cylinder 10 is needed. When all stages are extended, to retract the same, first the third stage 28 is retracted, then the second stage 20, and finally the first stage 12.

It should be appreciated that the cylinder 10 may include more or less than three stages, and still be a telescoping cylinder that encompasses some or all of the elements as included in the description and accompanying figures.

Figure 2:
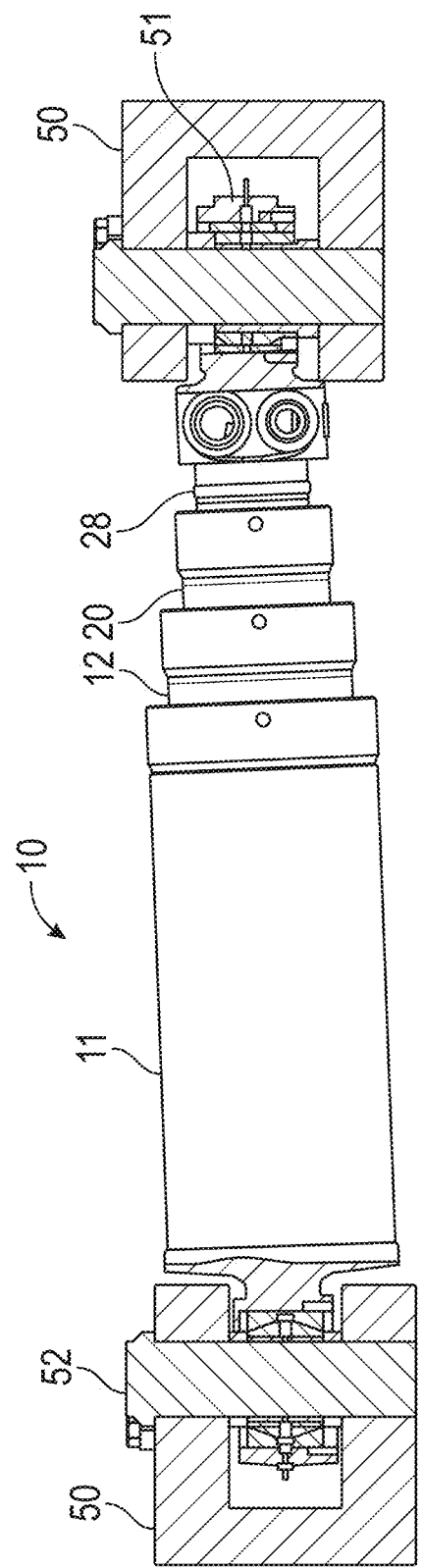
FIG. 2 is a view similar to FIG. 1, showing cross-sectional views of the mounts at the ends of the telescoping, hydraulic cylinder.

FIGS. 1 and 2 show the cylinder 10 with end mounts 50 at each of the ends of the cylinder 10. The end mounts 50 are used to connect the cylinder 10 to a structure or environment for use, such as a refuse vehicle. The end mounts 50, including an end mount housing 53, as will be included herein, may include a sleeve bushing 54 and/or spherical bearing 56 in some embodiments, but this is not required in all embodiments. The bushing 54 and/or bearing 56 can be used to allow some movement of the cylinder 10 relative to the environmental structure, as will be explained herein.

Figure 3:
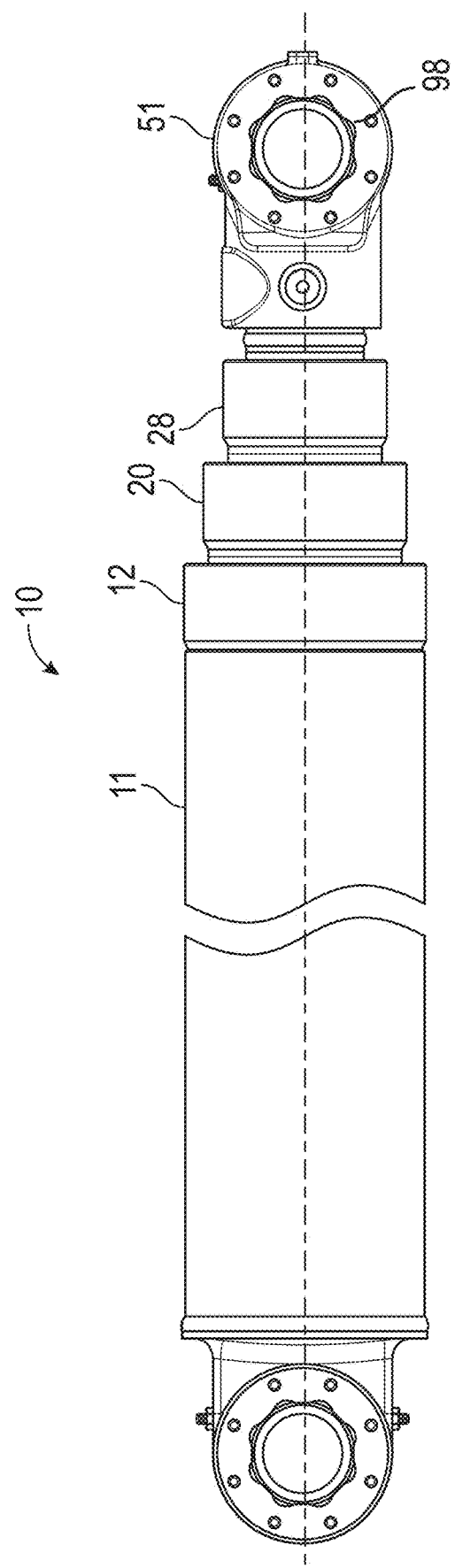
FIG. 3 is a view similar to that shown in FIG. 1.

Still further, FIGS. 1-3 show the cylinder 10 with all of the stages in a retracted position, such that the cylinder is unused or retracted to save space. However, it should also be appreciated that the retracted cylinder 10 can also be in the use configuration, such as when the "normal" configuration is extended.

Figure 4:
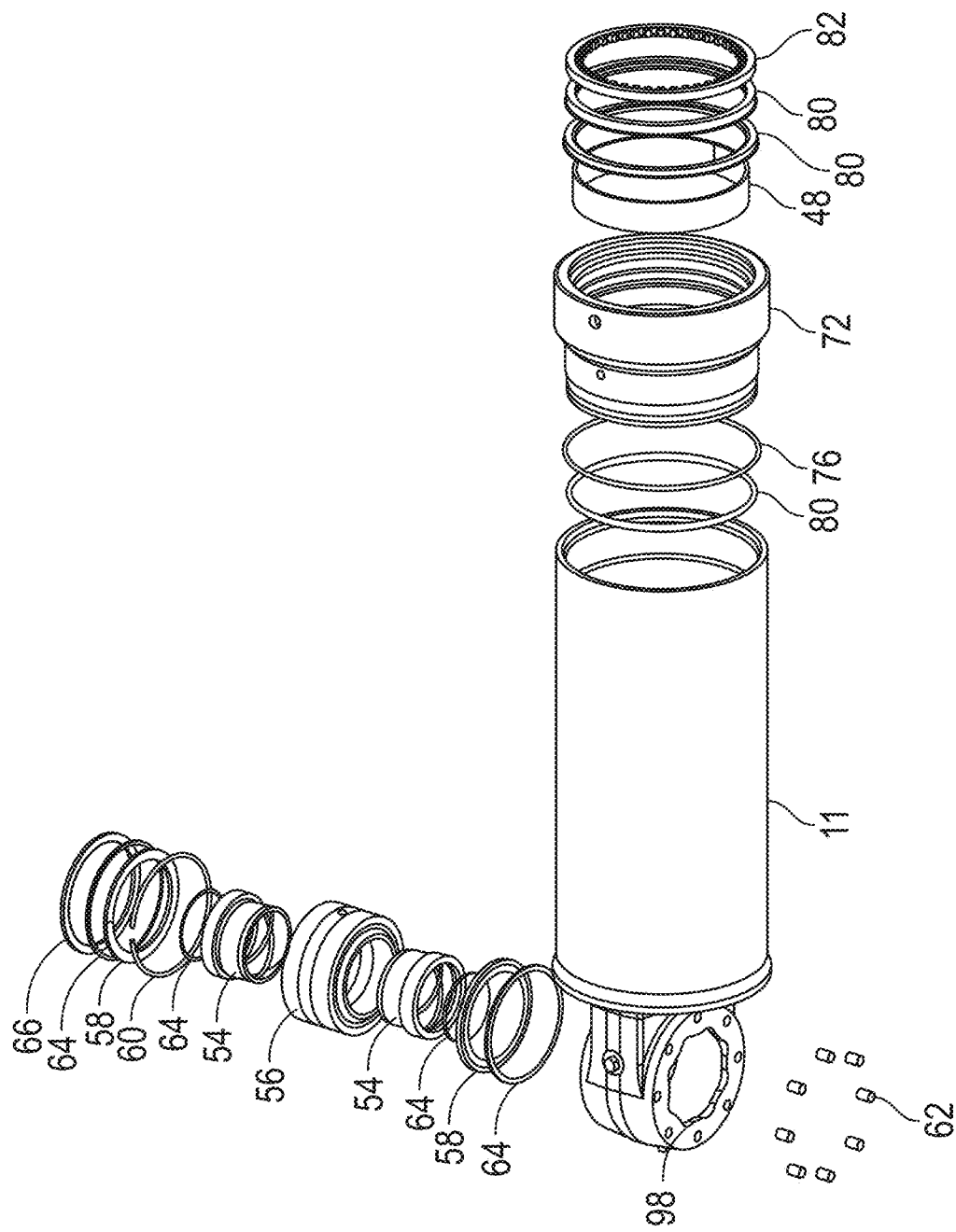
FIG. 4 is an exploded view of the barrel of a cylinder similar to that shown in FIG. 1.
Figure 5:
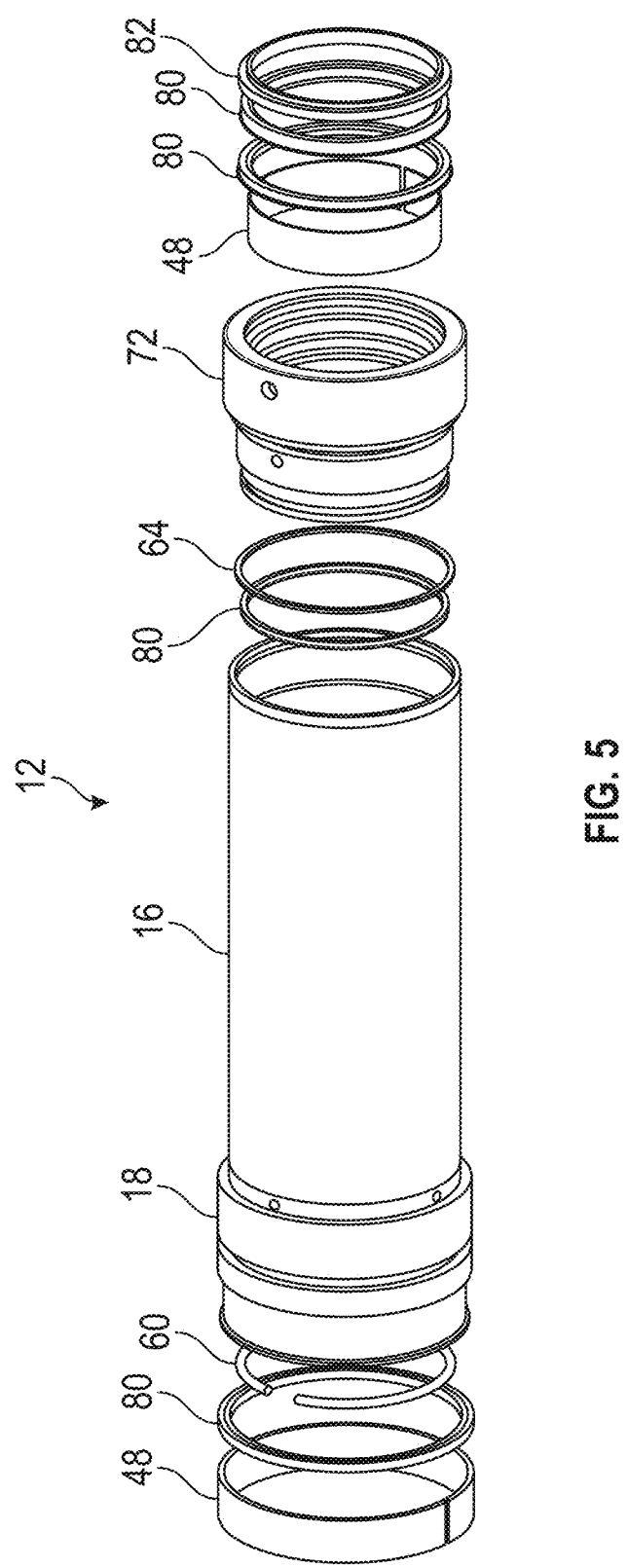
FIG. 5 is an exploded view of the first stage of a cylinder similar to that shown in FIG. 1.
Figure 6:
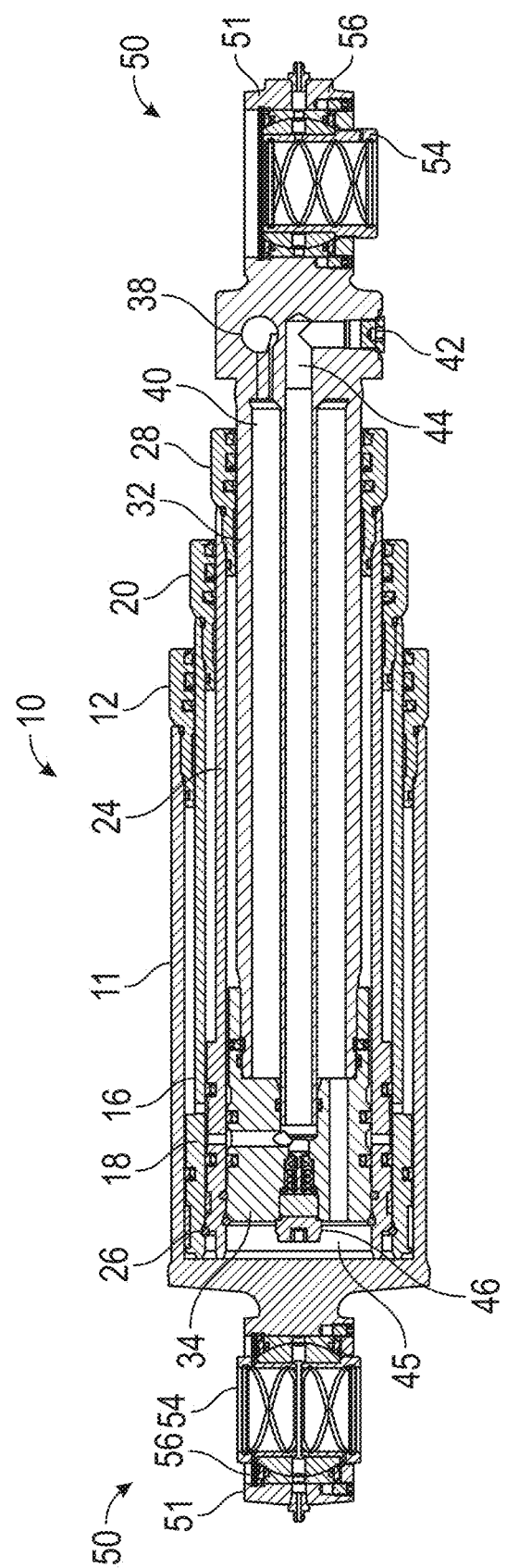
FIG. 6 is a sectional view of a cylinder showing the ports and flow passages for stage 1 of a telescoping cylinder.

FIGS. 4 and 5 show aspects of the main barrel 11 and first stage 12, such as the barrel 11 being exploded in FIG. 4 and the first stage 12 being exploded in FIG. 5 and showing portions of the oil ports and paths in FIG. 6. As shown in FIG. 6, the cylinder 10 includes a first stage 12. A cylinder barrel 11 is also shown. A first stage rod 16 and piston 18 (see, e.g., FIG. 6) would be positioned in the barrel 11, with the piston 18 positioned towards the left side of the barrel 11. A gland assembly or cap 70 is shown exploded and would be positioned generally at the end of the rod 16 on the right side. The gland assembly 70 includes a head gland 72 with seals 80 (including rod buffer seals, rod seals, piston seals, and static head seals), O-rings 76 of variable size, wear bands 48 of variable size, and a rod wiper 82.

Also shown in FIG. 4 is an exploded bearing assembly 51 that would be connected to an end mount 50. The bearing assembly also includes spiral retaining rings 66, O-rings 64 of variable sizes, bearing scrapers 58, a retaining ring 60, a bearing or bushing sleeve 54, and a spherical bearing 56. Aspects of the bearing assembly 51 will be disclosed in greater detail herein.

As noted, FIG. 5 includes the first stage 12, which includes, in part, a piston rod 16 and piston 18. There are also a number of seals 80, O-rings, 64, wear bands 48, and retaining rings 60. At the right side of the rod 16 is a gland including a head gland 72, wear band 48, seals 80, and rod wiper 82.

FIG. 6 is a cross-sectional view of the cylinder 10 showing aspects of the stage 1 hydraulic oil ports (extension port 38 and retraction port 42), as well as parts of the extension oil path 40 and retraction path 44. FIG. 6 shows that the extension path for all of the stages is aligned such that all of the stages will receive a common oil source, which is shown as the pool 45 in the figures. As is also to be appreciated, when in the configuration shown in FIGS. 6 and 9, the retraction oil path 44 will all be aligned, such that the stages will all receive a portion of the hydraulic oil to retract all three of the stages. This is known in telescoping cylinders.

FIG. 6 also includes all of the rods ($1^{st}$ stage rod 16, $2^{nd}$ stage rod 24, and $3^{rd}$ stage rod 32), all of the pistons ($1^{st}$ stage piston 18, $2^{nd}$ stage piston 26, and $3^{rd}$ stage piston 34), as well as all of the glands ($1^{st}$ stage gland, $2^{nd}$ stage gland, and $3^{rd}$ stage gland). Still further, figure shows a first bearing assembly 51 at the left end and a second bearing assembly 51 at the right side. As noted, the bearing assemblies can be connected to end mounts at the assemblies for use thereof.

Figure 7:
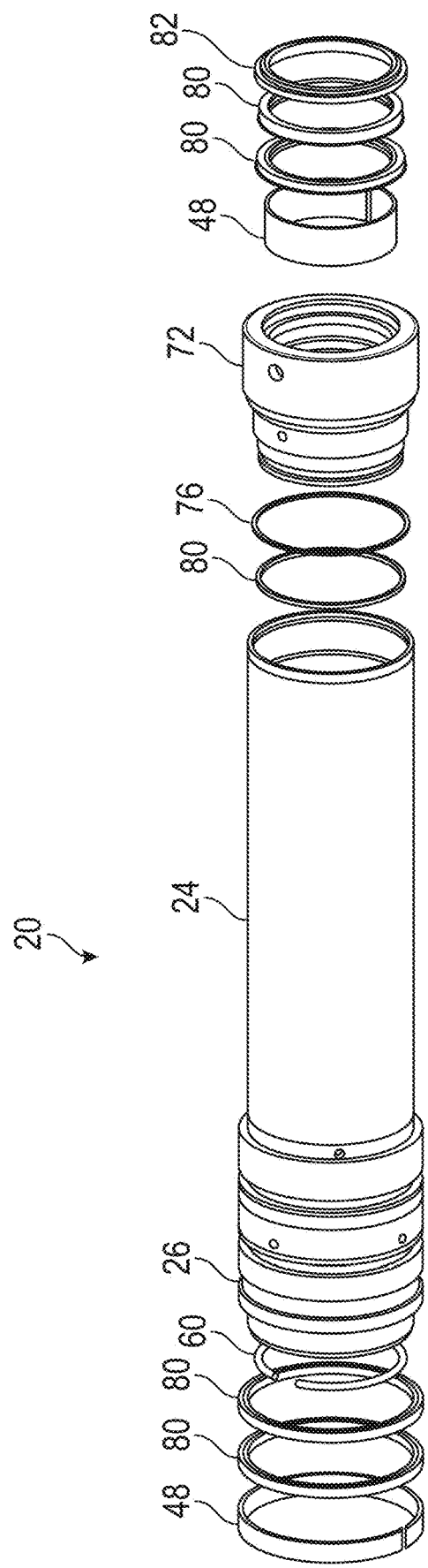
FIG. 7 is an exploded view of the second stage of a cylinder similar to that shown in FIG. 1.

FIG. 7 is an exploded view of the second stage 20 of the cylinder 10. The figure includes the second stage rod 24, piston 26, and an exploded second stage gland assembly (shown as 70 in the figure). Similar to first stage, the gland assembly 70 includes a head gland 72, O-rings 76, seals 80, a wear band 48, and a rod wiper 82. The piston 26 includes a wear band 48, seals 80, and a retaining ring 60.

Figure 8:
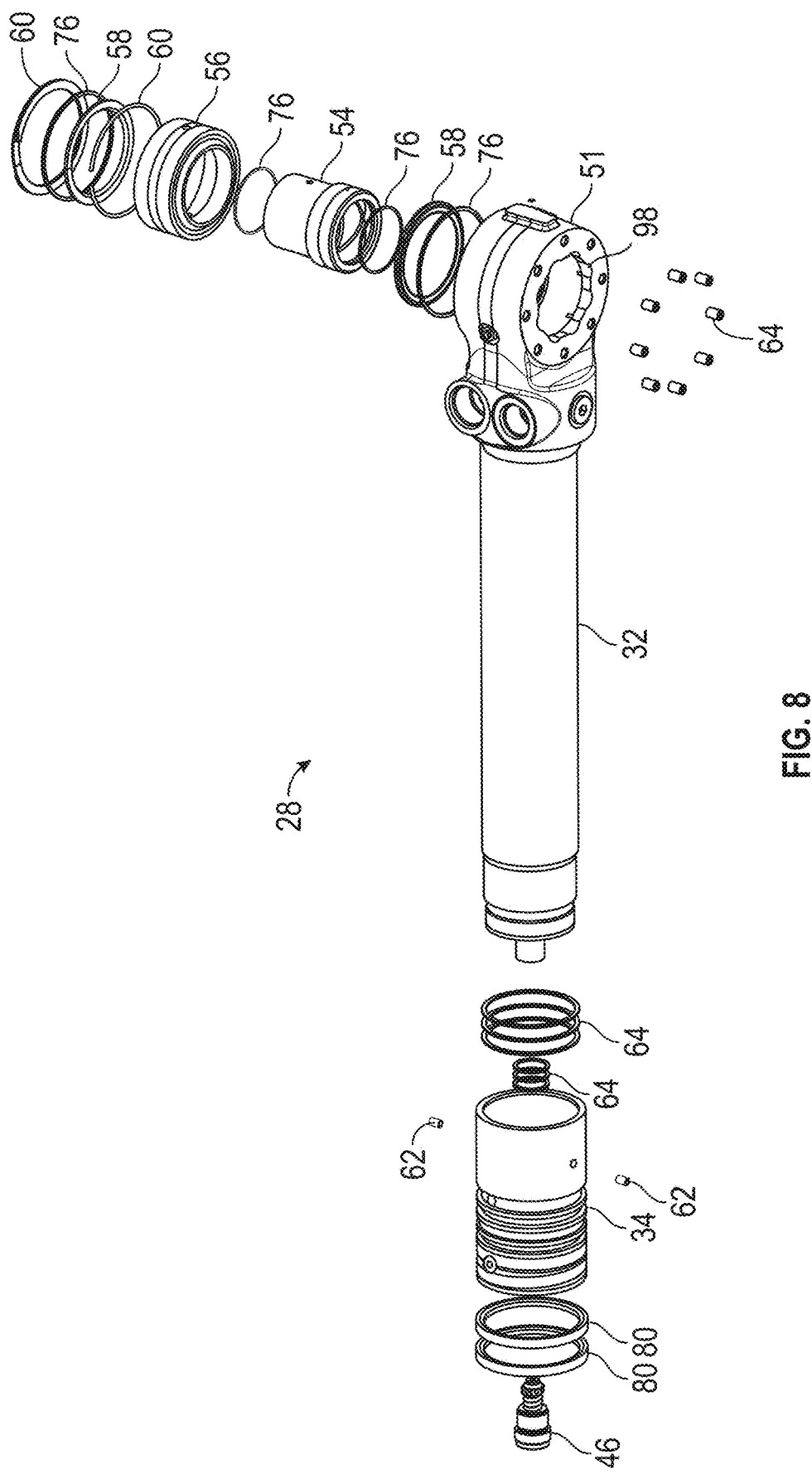
FIG. 8 is an exploded view of the third stage of a cylinder similar to that shown in FIG. 1.

Likewise, FIG. 8 is an exploded view of the third stage 28 of the cylinder. The figure shows the third stage rod 32 and piston 34. The 34 piston includes a valve 46 (which will be described in greater detail herein), seals 80, O-rings 64, and screws 62. Also shown at the right of the third stage 28 is a bearing assembly 51, including many of the similar components as has been disclosed herein.

Figure 9:
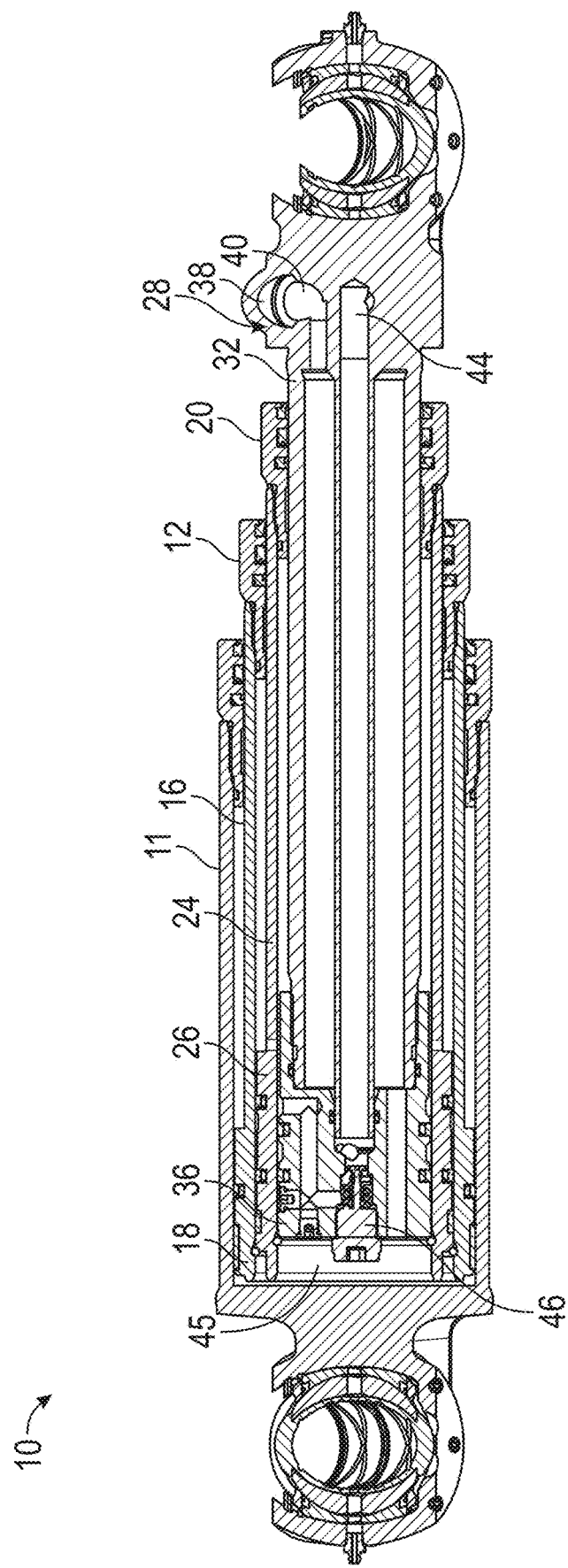
FIG. 9 is a sectional view showing aspects of stages 2 and 3 of a telescoping cylinder such as shown and described herein.

FIG. 9 is a cross sectional view of the cylinder 10 similar to FIG. 6 but rotated to show planes of the interior of the cylinder that were not viewable in FIG. 6. For example, FIG. 9 shows the oil ports and paths for the extension and retraction of the second and third stages of the cylinder, which were not as visible in FIG. 6.

As noted, a valve 46 is included in the cylinder 10 and is communicable in the oil retraction path for the second and third stages. The valve may be a relief valve, which is a type of safety valve used to control or limit the pressure in a system. The relief valve 46 can be selected based on desired use but is generally used to control the extension of the telescoping stages of the cylinder. Still further, it should be appreciated that the valve can be a check valve or other pressure relieving valve.

Figure 10:
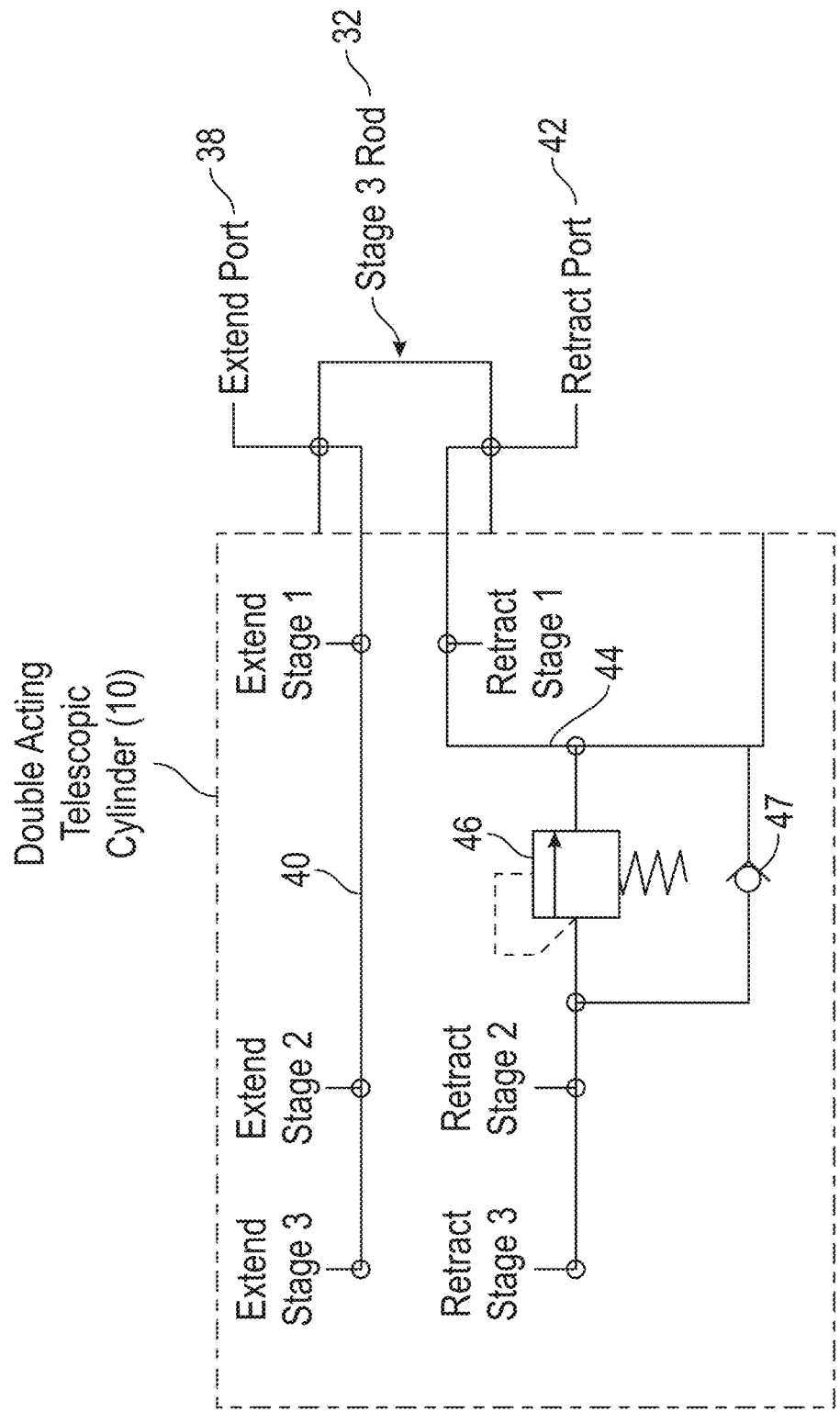
FIG. 10 is a schematic showing a hydraulic circuit for a telescoping hydraulic cylinder according to aspects and/or embodiments described herein.
Figure 11A:
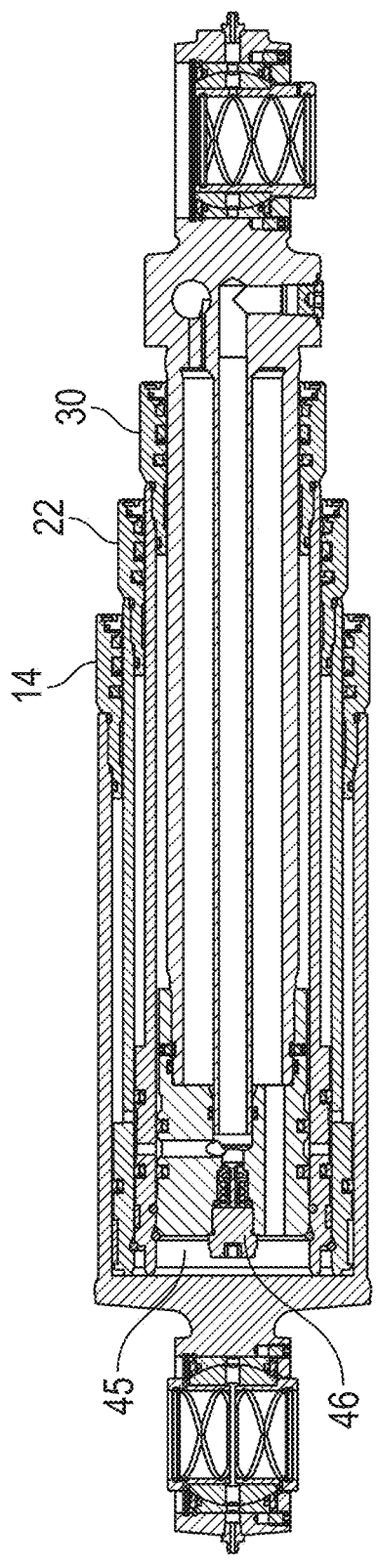
FIGS. 11A-11C are sectional views of a telescoping hydraulic cylinder showing the extension of the stage 1 of the cylinder.
Figure 11B:
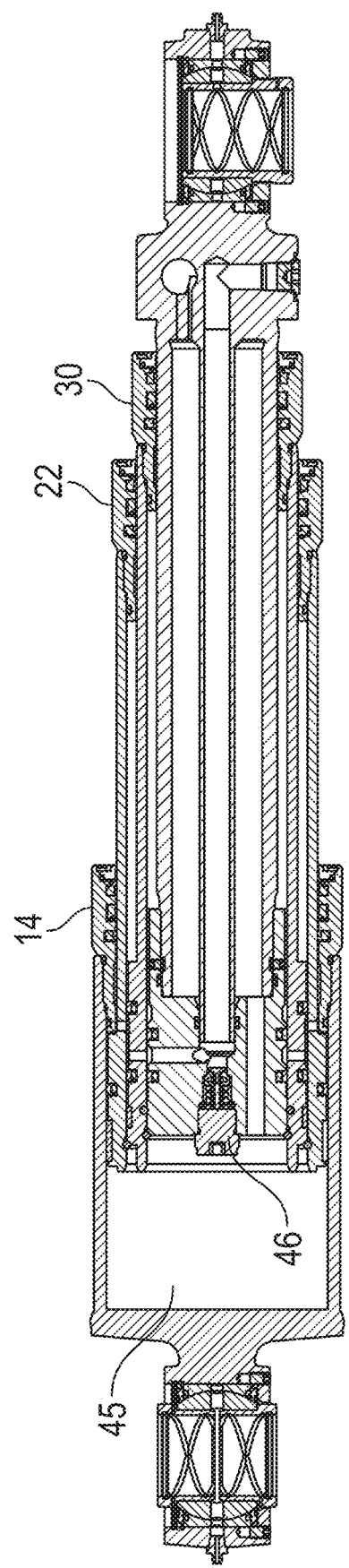
Figure 11C:
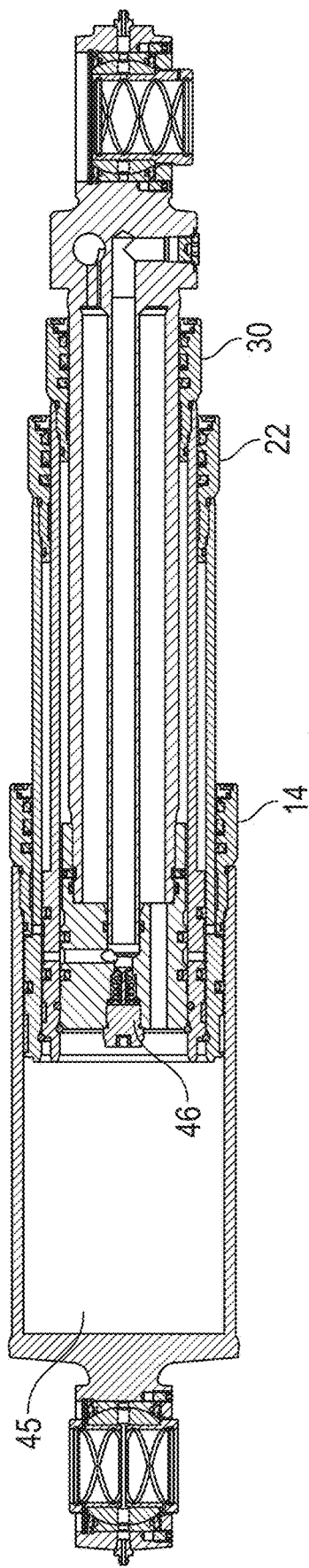

FIG. 10 is a schematic of the hydraulic circuit 36 for use with the telescoping cylinder 10 of the present disclosure. As will be understood, the circuit 36 is used to mitigate mis-staging of the stages of the cylinder during use. The schematic 36 shows an extension port 38 and an extension path 40, which is connected to all three stages. All of the extend sides of the stages share common oil to the extend port. This is shown throughout the figures as the pool 45, which is used to provide a force on the pistons of the stages to extend the stages.

The schematic 36 also includes a retraction port 42 and retraction path 44. The retraction path 44 includes a valve 46 and a free flow portion 47. The valve 46 may include the check function as well as the relief function, even though they are shown to be separate in the schematic. The retract side of the first stage (largest) allows free flow to and from the retract port 42. The 2nd and 3rd stage retract paths are blocked from oil exiting during extension until a sufficient pressure is reached to open the hydraulic relief valve 46. This pressure is generated after the first stage reaches its full extended stroke and the pressure intensifies when stage 2 wants to start moving due to the larger working area of the extend side vs. the working area of the retract side. When the cylinder 10 is retracted in stages 2 or 3, there is free flow from the retract port to the retract areas of stages 2 and 3 because there is a free flow check function 47 bypassing the relief valve in this direction.

The hydraulic schematic 36 as shown will mitigate mis-staging of the cylinder 10, especially when the first stage 12 needs to extend under low load induced pressure, which is generally a condition where mis-staging will occur.

The movement of the stages and thus, the benefits of including the valve 46 in the retract path 44 are shown in FIGS. 11-16. For example, in FIGS. 11A-11C, the cylinder is being extended with the first stage 12 extending first. As noted, there is a common oil pool that has been added via the extension path 40 and is collected at 45, wherein the oil will exert a load/force on all three of the pistons 18, 26, and 34 at the same time. It should be noted that there will be oil in the retraction path as well for each of the stages that needs to be expelled for the stages to move in the extended direction. However, the use of the valve in the second and third stage retraction paths will not be allowed to be expelled until such a force is exerted on the valve, which mitigates movement of the second or third rods of the stages until such time that the first stage has been fully extended.

Referring back to FIGS. 11A-11C, hydraulic oil is being added to the location 45 to exert a force on the pistons. This will cause the rods of the cylinders to begin moving to the right. As noted, the valve 46 will mitigate opening of the retraction path for the second and third stages, meaning that oil will remain in the retraction path for the second and third paths, thus mitigating movement of the second or third rods. Therefore, continued addition of oil in the extension path will move the first stage rod from that shown in FIG. 11A to FIG. 11B and then eventually FIG. 11C, where the first stage stroke is at its maximum.

Figure 12A:
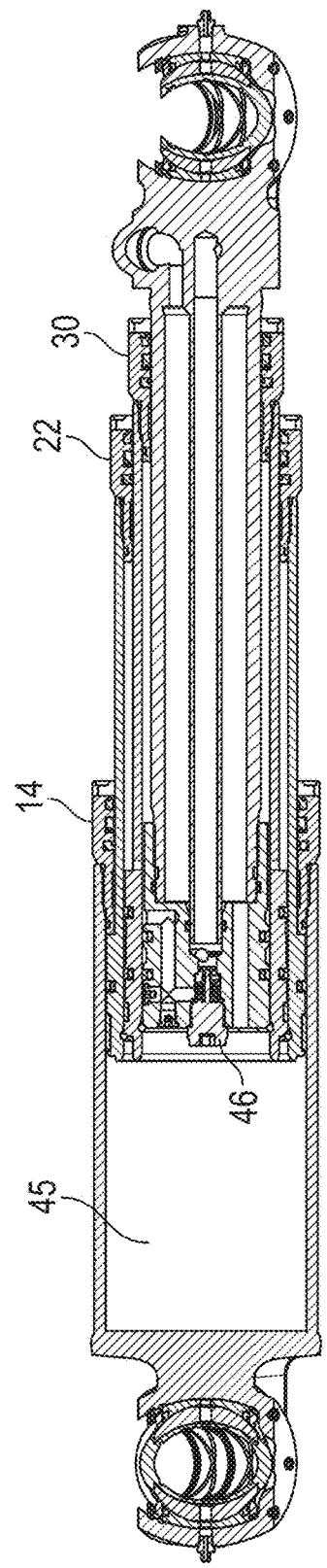
FIGS. 12A-12C are sectional views of a telescoping hydraulic cylinder showing the extension of the stage 2 of the cylinder.
Figure 12B:
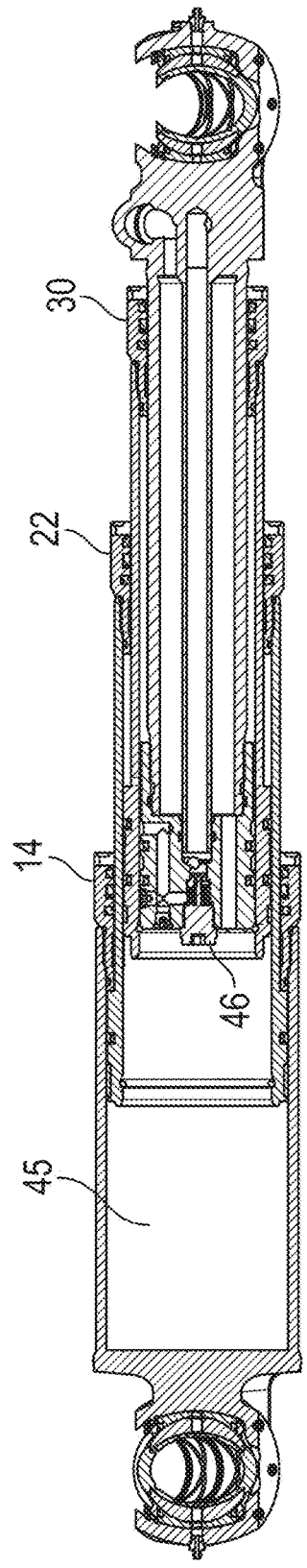
Figure 12C:
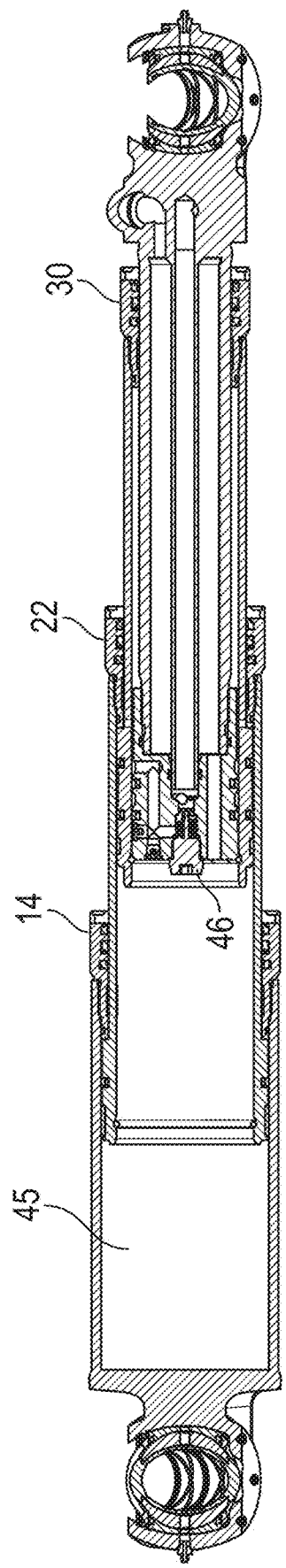

Moving now to FIGS. 12A-12C, as is shown in the figures, due to the first stage at maximum stroke, continued oil at the pool 45 will exert a force on the valve 46 until such time that the pressure relief valve 46 has been overcome of force, thus opening a path through the valve. This opens the retraction path for the second and third stages, thus allowing oil to be removed from said path. This allows movement of the second stage, as the valve is aligned with the retraction path for the second stage, and the second stage has a larger surface area for the oil in the location 45 to be exerted, thus moving the second stage rod and piston towards the right, as shown in sequential FIGS. 12A to 12B and then eventually 12C, where the second stage has reached its maximum stroke length.

Figure 13C:
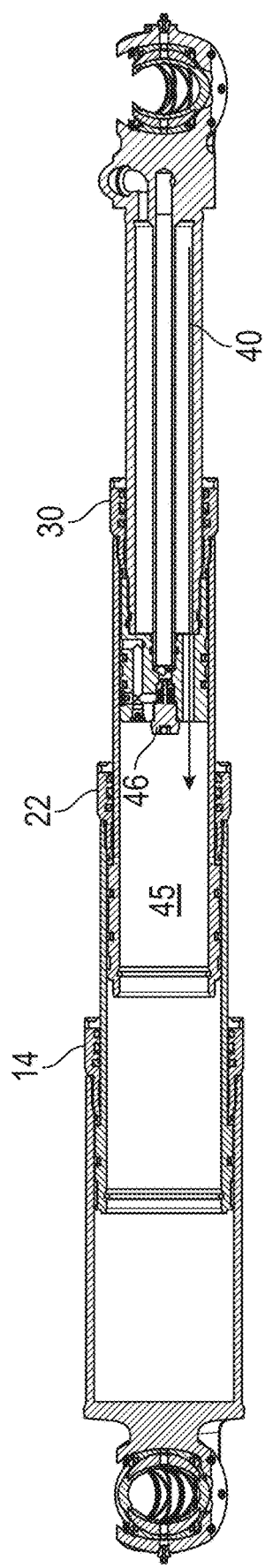

Finally, as shown in FIGS. 13A-13C, the extension of the third stage is allowed. The valve is continued in an open position to allow the retraction oil to be passed from the retraction path for the third stage. As the first and second stages are at maximum stroke, the third stage is the only movable stage for the extension oil to exert a force (see, e.g., the arrow 40 in FIG. 13C, showing the direction of the oil extension path towards the pool 45, where the oil is exerted on all three of the pistons of the stages of the cylinder 10) to move the third stage towards the right, such as shown in sequential figures of FIGS. 13A to 13B and finally 13C, where the third stage is at maximum stroke length. Thus, the cylinder 10 is at full stroke length in FIG. 13C, with all of the stages fully extended.

Figure 14A:
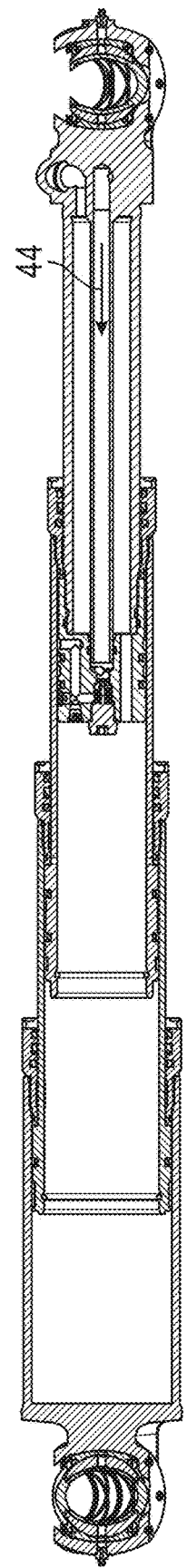
FIGS. 14A-14C are sectional views of a telescoping hydraulic cylinder showing the retraction of the stage 3 of the cylinder.
Figure 14B:
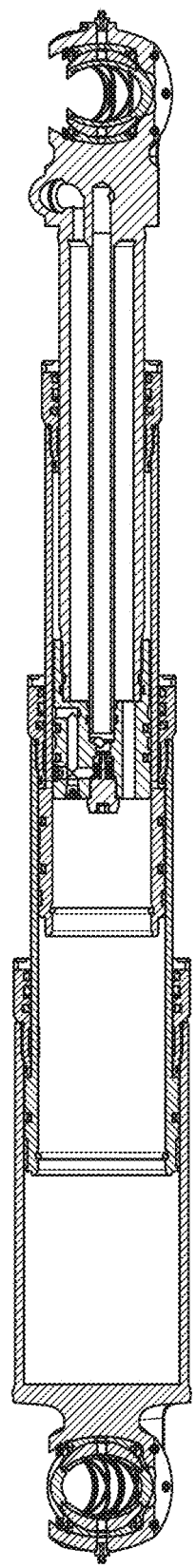
Figure 14C:
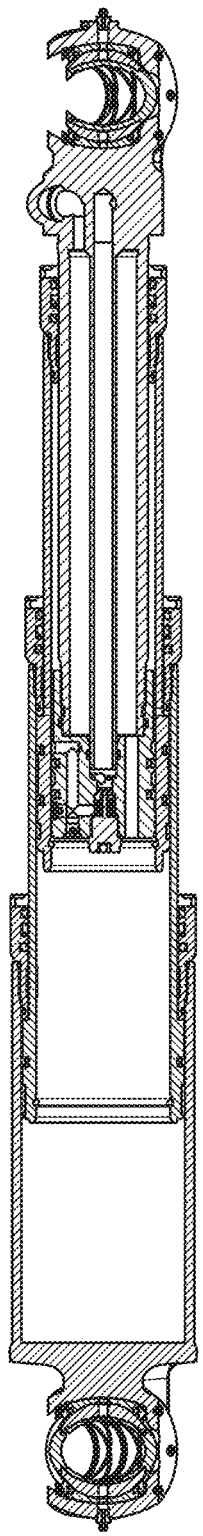

FIGS. 14-16 show sequential retraction of the stages, with the third stage first retracted in FIGS. 14A-14C. As shown in FIG. 14A, oil is added via the retraction path 44 (see arrow in FIG. 14A). This oil exerts a force on the retraction side of the third stage piston 34, thus moving the third stage towards the left, which is shown in sequential steps moving from FIG. 14A to 14B and finally 14C, wherein the third stage is fully retracted. As the stage retracts, oil is expelled or removed from the common extension sides of the pistons via the extension path. There are ports between each of the stages for the retraction oil to pass, and the ports for the second and third stages are not aligned until the third stage is retracted, which mitigates retraction of the first or second stages until such time that the third stage is retracted.

Recall that the retraction path includes a free flow from the retract port 42 to the retract areas of stages two and three such that the retraction oil will bypass the valve, not affecting the flow of the oil for retraction.

Figure 15A:
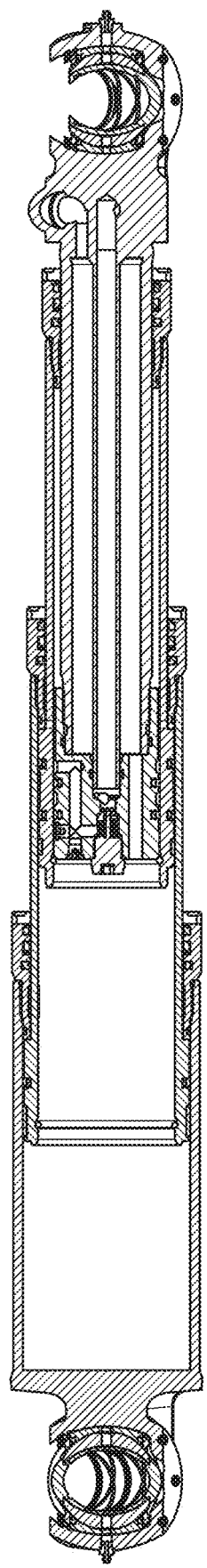
FIGS. 15A-15C are sectional views of a telescoping hydraulic cylinder showing the retraction of the stage 2 of the cylinder.
Figure 15B:
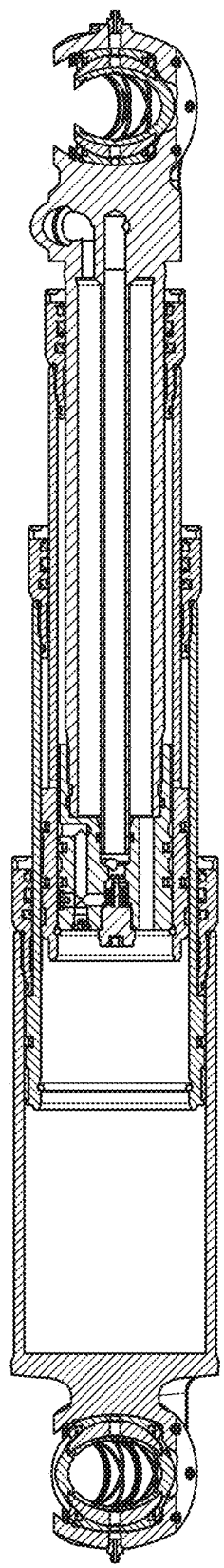
Figure 15C:
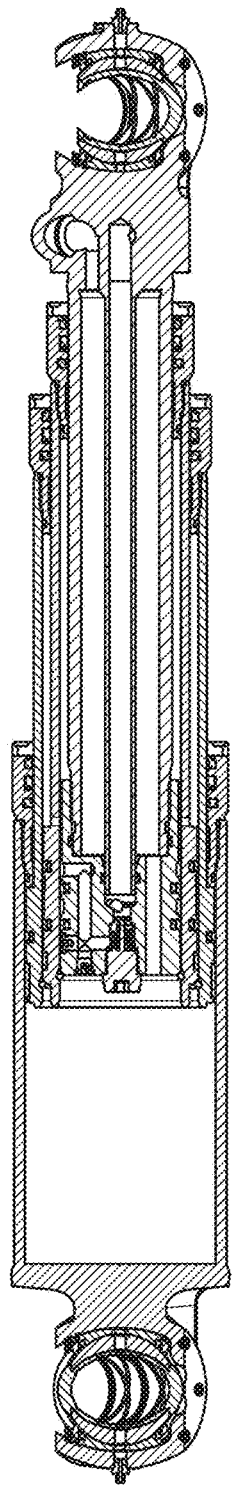

FIGS. 15A-15C show retraction of the second stage. As disclosed, after the third stage has retracted, ports are aligned to allow the retraction oil of the retraction path to pass towards the retract side of the second stage piston 26, which will exert a force thereon to move the second stage piston and rod towards the left of the figures moving from FIG. 15A to 15B and finally 15C, where the stage is fully retracted. At the position shown in FIG. 15C, with the stage fully retracted, ports between the second stage and the first stage are aligned, to allow the retraction oil to pass into the first stage towards the retraction side of the first stage piston.

Figure 16A:
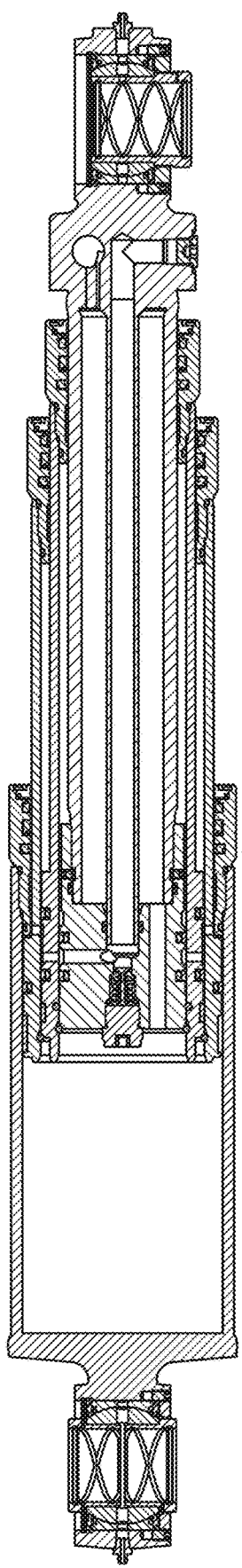
FIGS. 16A-16C are sectional views of a telescoping hydraulic cylinder showing the retraction of the stage 1 of the cylinder.
Figure 16B:
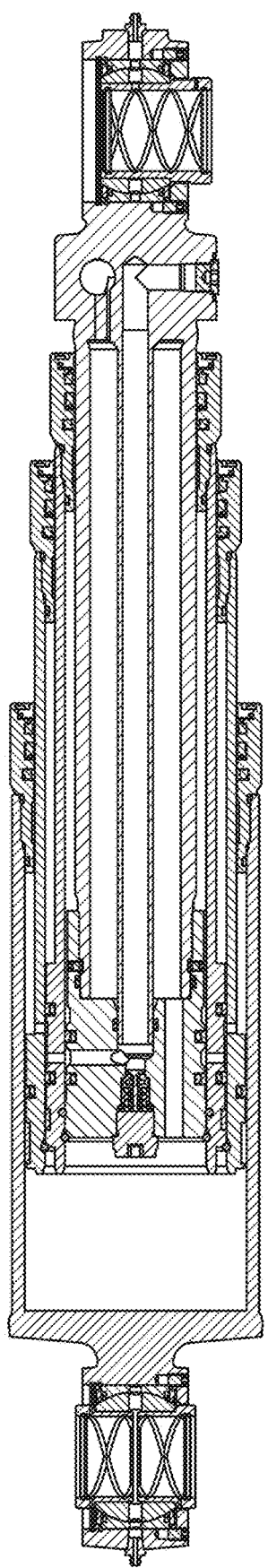
Figure 16C:
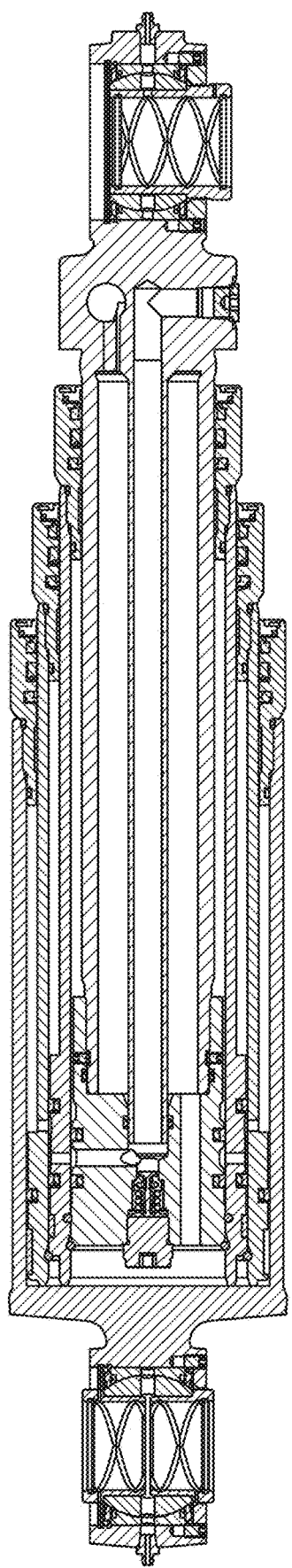

Finally, as shown in FIGS. 16A-16C, retraction of the first stage is shown to occur. The alignment of the ports between the first and second stages in the retract path 44 allows the retract oil to exert a force on the retract side of the first stage piston. This will expel the extension oil and will move the first stage towards the left of the figure, moving through the sequential FIGS. 16A to 16B and finally 16C, wherein the first stage (and thus all stages) is fully retracted to its un-extended configuration.

Therefore, the hydraulic oil paths including the relief valve in the second and third stage extension paths will mitigate mis-staging and provide for better control of the extension of the hydraulic telescoping cylinder 10.

As noted, while the figures show three stages, the inclusion of the relief valve 46 can be used for any number of stages of a telescoping cylinder, and thus, the number of stages should not be limiting on the disclosure.

FIGS. 17-26 show additional aspects and/or embodiments of a hydraulic cylinder and can be used on telescoping or non-telescoping cylinders. As noted, cylinders can be mounted to structures via end mounts 50, which may include pinned connections (e.g., a pin through a bearing assembly 51 and the end mount 50). Many types of bearings are used in pinned connections. Two examples are spherical bearings and sleeve bushing/journal bearings. Spherical bearings are often desirable in applications where there is misalignment in the joint such as a hydraulic cylinder where the mounts of the base end and rod end are not aligned perfectly. These bearings allow for complete rotation in the pin axis direction as well as articulation perpendicular to the pin a few degrees. This is shown for comparison in FIGS. 19 (centered) and 20 (bearing articulated via spherical bearing), as well as FIGS. 21 (bearing centered) and 22 (sleeve articulated via spherical bearing). See also FIG. 28, which shows the articulation of the bearing assemblies 51 at misaligned end mounts 50 and with pins 52 therethrough.

In very dirty environments, spherical bearings can be easily damaged due to debris pushing into the ball and race area of the spherical bearing. Some dirty applications will avoid the use of spherical bearings because of this limitation. In many cases, a sleeve bushing is used as it does not allow debris to damage it as easily. However, these sleeve bushings do not allow for the additional articulation perpendicular to the pin, which can put additional strain on the cylinder and mounts. Sleeve bushings can also be installed in housing that have various widths allowing for more flexibility in mount widths.

As shown in the figures, the bearing assemblies of the aspects and/or embodiments disclosed herein include bushings 54 for receiving a pin, and a spherical bearing 56 for providing the articulated movement.

Figure 17:
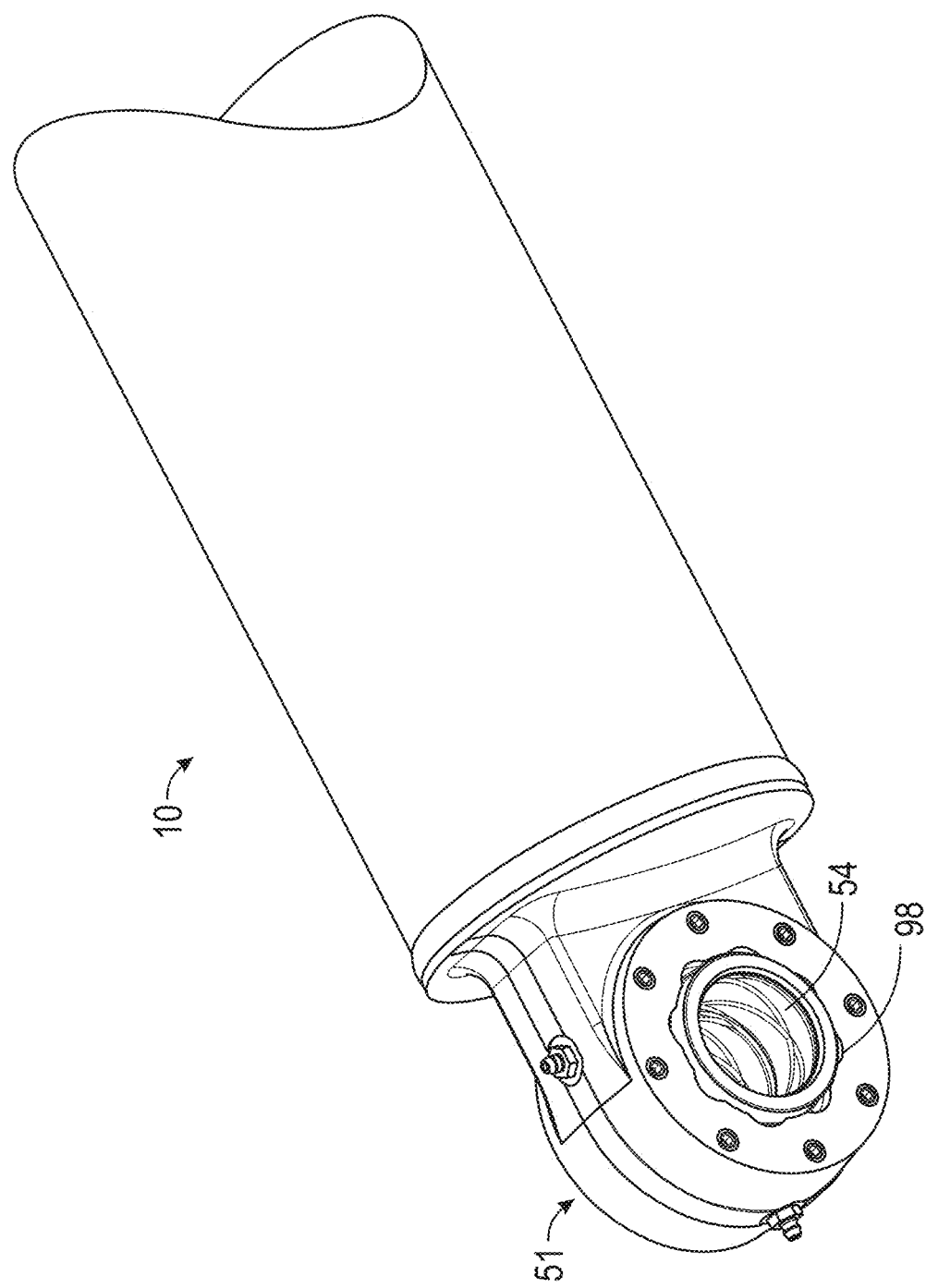
FIG. 17 is a view of a mount with spherical bearing for use with a cylinder according to aspects and/or embodiments disclosed herein.
Figure 18:
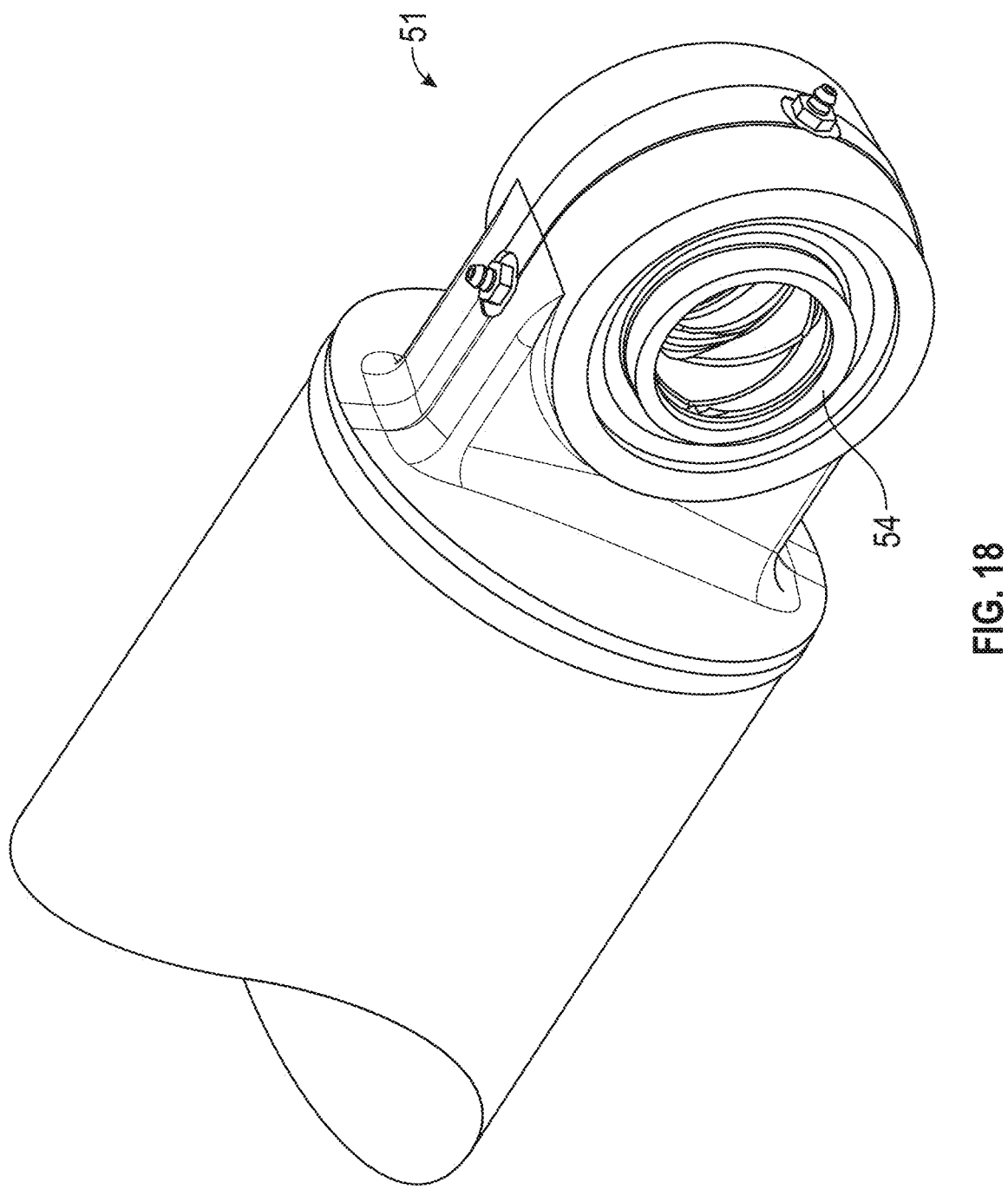
FIG. 18 is another view of the mount with spherical bearing.
Figure 20:
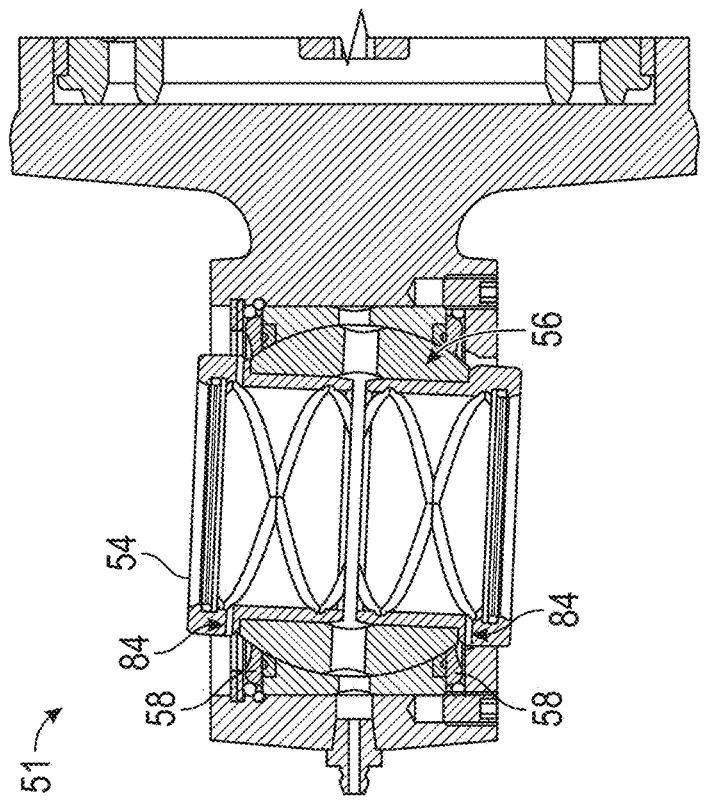
FIG. 20 is a sectional view showing the spherical bearing in an articulated position.
Figure 19:
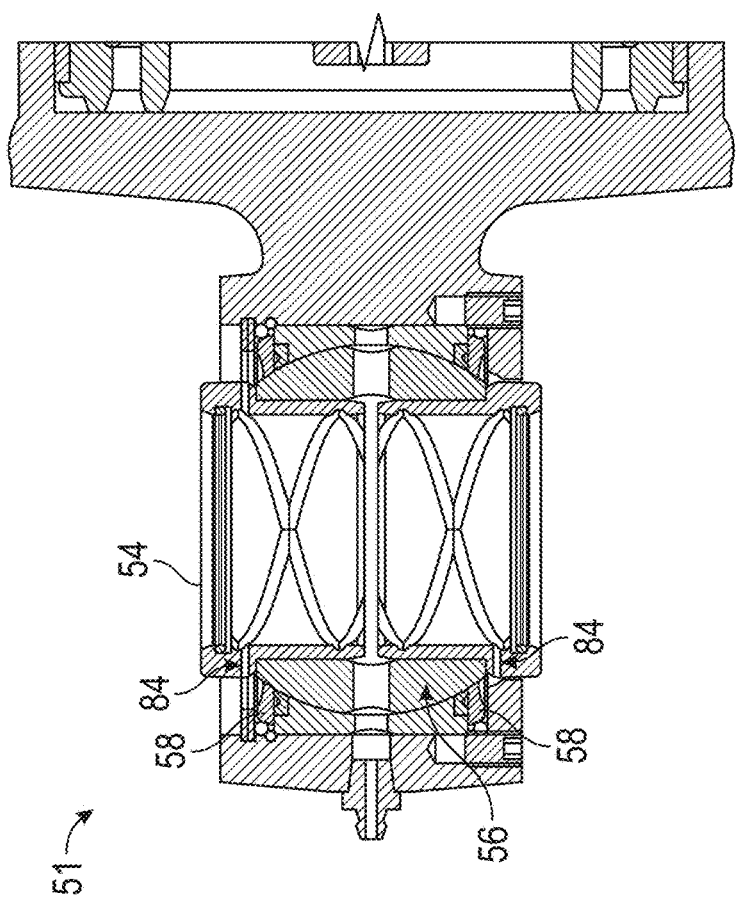
FIG. 19 is a sectional view showing the spherical bearing of the mount in a centered position.
Figure 22:
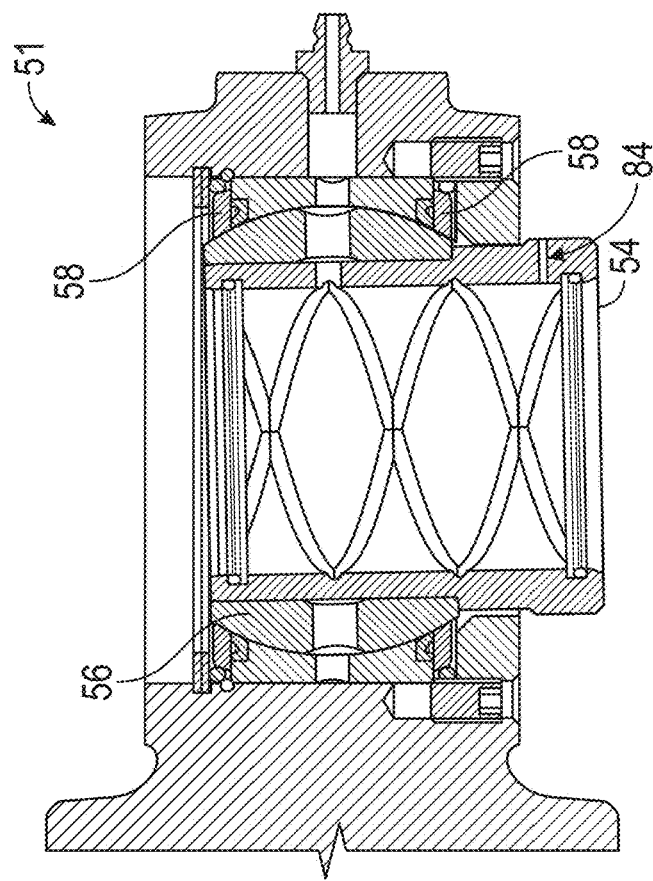
FIG. 22 is another sectional view showing the bearing in an articulated position.
Figure 21:
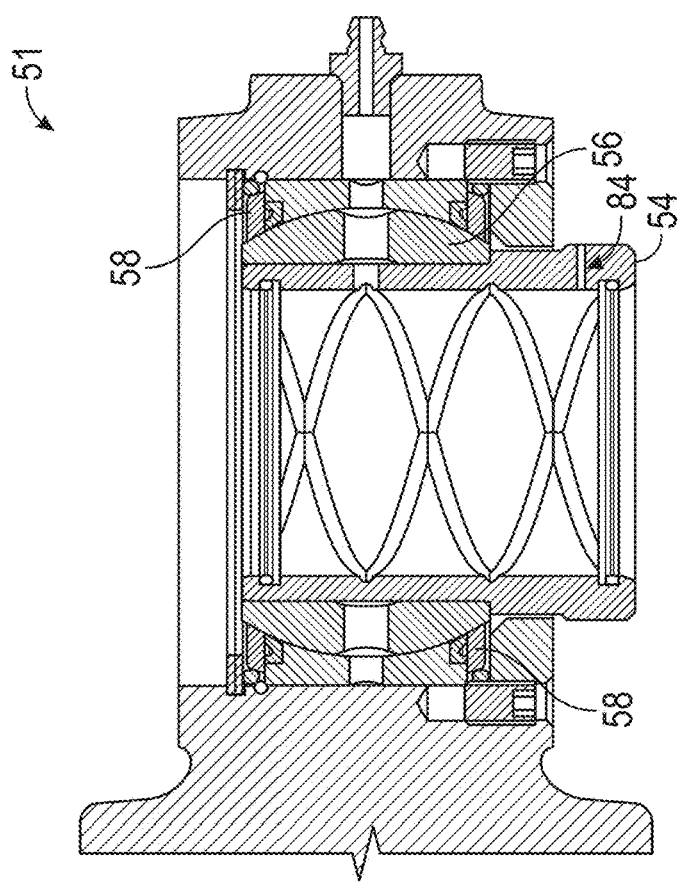
FIG. 21 is another sectional view showing the bearing in a centered position.
Figure 24:
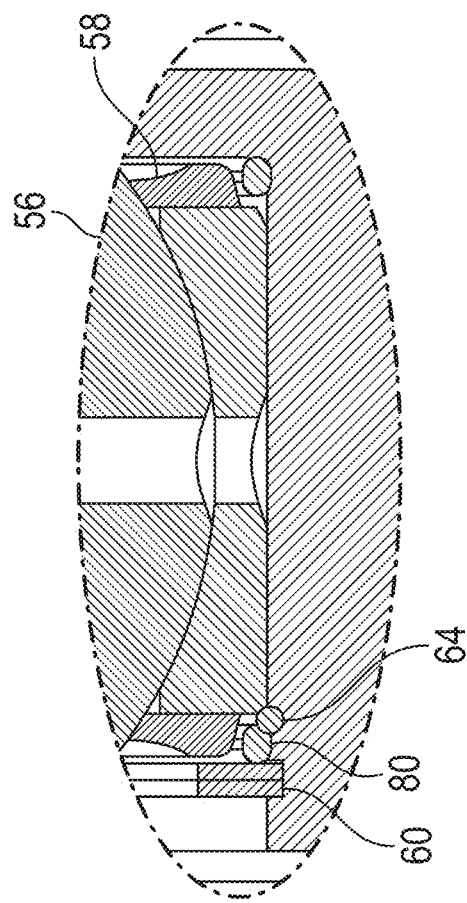
FIG. 24 is an enlarged portion of FIG. 23.
Figure 23:
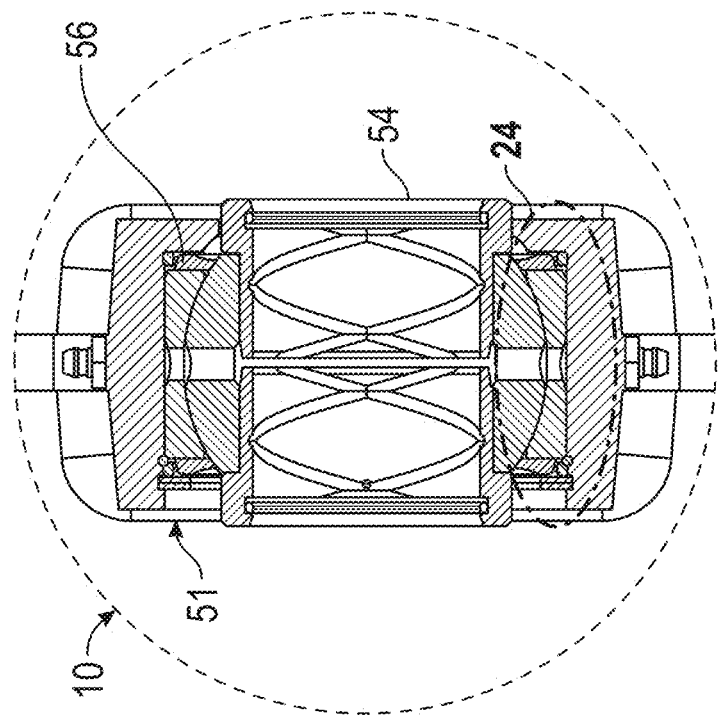
FIG. 23 is a sectional view of FIG. 3 taken along lines A-A.
Figure 26:
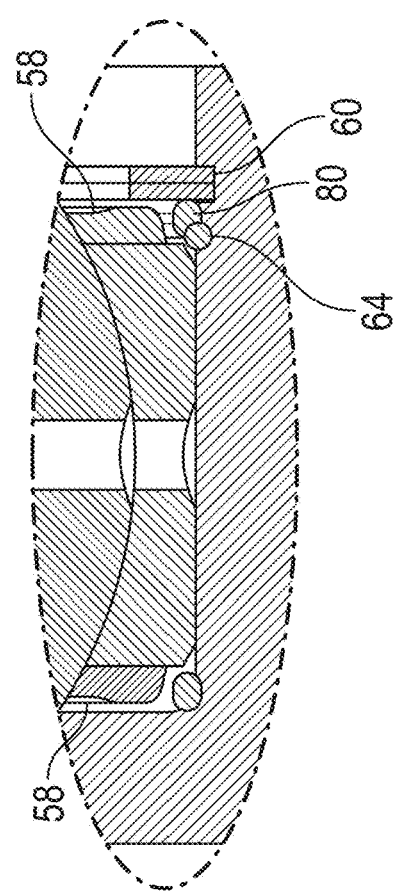
FIG. 26 is an enlarged portion of FIG. 25.
Figure 25:
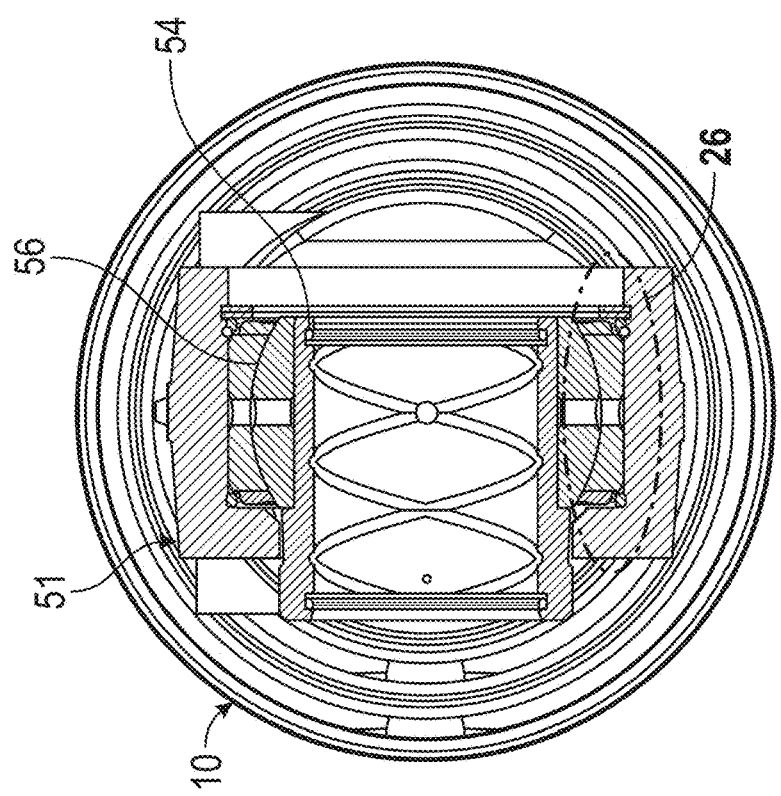
FIG. 25 is a sectional view of FIG. 3 taken along lines B-B.
Figure 27:
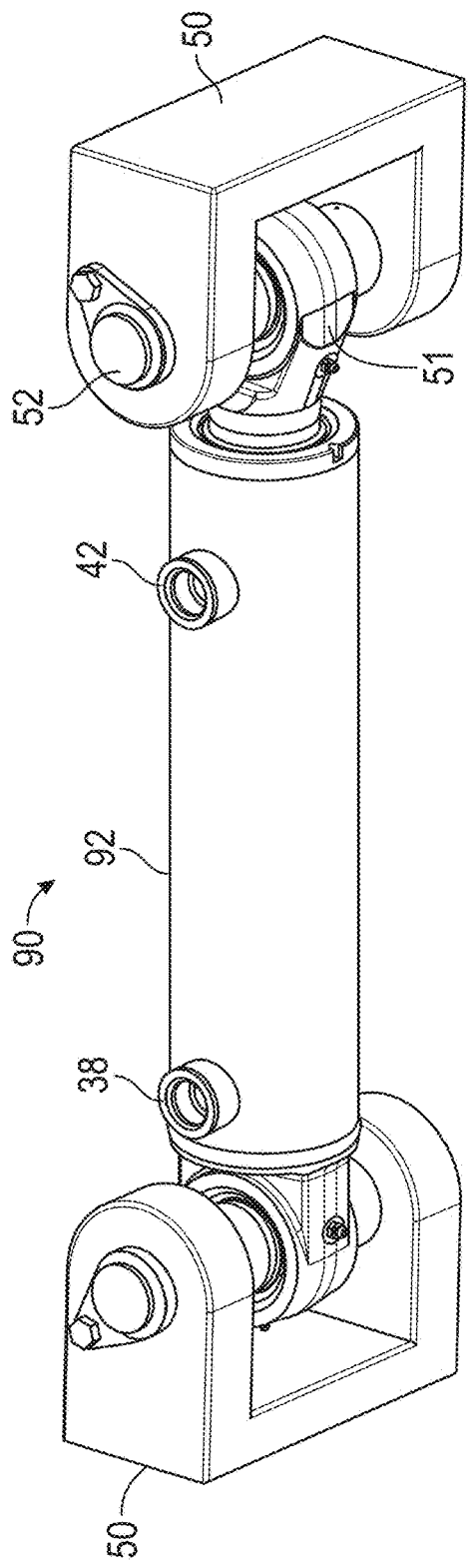
FIG. 27 is an isometric view of a non-telescoping, hydraulic cylinder, with mounts, according to aspects and/or embodiments of the present disclosure.

Installed in the ball inner diameter of the spherical bearing 56 are sleeve bushings 54 that can be customized to varying widths. FIGS. 17 and 18 provide such configurations where the bushings have different lengths to account for different connections with the end mounts. The spherical bearing 56 is installed in a housing that is wider than the race of the bearing. Metallic scrapers 58 are put on both sides of the bearing 56 against the ball to scrape away debris and to mitigate debris from being packed into the ball and race area of the spherical bearing 56 (e.g., the outer race 59 as shown). As shown, the metallic scrapers 58 may be metallic rings or ring-like members that include an edge or surface that is in contact or close contact with the ball to remove unwanted debris therefrom. The exact shape or configuration of the edge of the scraper should not be limiting, as generally any configuration capable of removing debris would suffice. In addition, while a metallic ring may be preferred in some embodiments, it should be appreciated that the scraper comprise generally any rigid material capable of removing debris and also standing up to the wear and tear of use. This also protects the elastomer seals 80 that are part of the bearing 56. Seals 80 are installed on the sleeve bushing 54 ends to seal the against the pin. See, e.g., FIGS. 5 and 8 for location of seals 80 related to the bearing and bushing. When the pin 52 is installed (see, e.g., FIGS. 1 and 2), it creates a sealed system that is sealed at each side of the ball with the ball seals and scrapers 58 and the ends of the bushings. Grease can be added at a hole in the housing with a grease zerk fitting or grease line. When grease is added, it creates a pressurized system because of the seals 80 on the ball and bushings. Grease is allowed to distribute well because air is allowed to escape from the end of the bushings through an orifice hole 84 (see, e.g., FIGS. 19-22 and 29B) near the ends of the bushing. This keeps grease well distributed and clean from debris improving the life of the bearing system.

In addition to the spherical bearing 56 allowing articulation of a few degrees perpendicular to the pin 52, the joint can completely rotate at both the pin sleeve area and the ball. This gives two pin axis rotation paths in case either the ball or sleeve bushing has excess friction debris or lack of grease from extended grease maintenance intervals.

This system also has a unique feature that allows the bearings 56 and protection components to be installed or field serviced easily without a press. These types of spherical bearings are typically pressed into a housing with a mechanical or hydraulic press using several tons of force. This design uses a slip fit on the housing of the bearing. The scraper components 58 are loaded in on one side, then the bearing 56 is slid in. Next, a metal round retaining ring 60 is installed behind that. A series of screws 62 are tightened against the race of the bearing, pushing it against the retaining ring 60 and making a secure fit in the housing. Then the remaining scraper components 58 are installed with a flat retaining ring 66 securing those in the housing.

This is shown in FIGS. 5 and 8 in exploded view, and in FIGS. 19-22 with all of the components in place. For example, the scrapers 58 on either side of the spherical bearing 56 are shown adjacent the ball of the bearing to aid in removing unwanted debris from the ball. Therefore, the use and inclusion of the scrapers 58 with the spherical ball bearing should increase the life and use of the bearing, providing an improved bearing assembly and connection for the cylinders, even in dirtier conditions and/or environments.

To aid in protecting the ball seals and scrapers from damage from the ball rotating too far and contacting the pin or a sleeve bushing, the housing has a lip design that contacts a matching profile on the sleeve bushing that limits the articulation. This lip also has scallops 98 cut into it to allow for debris to evacuate away from the scrapers.

Figure 28:
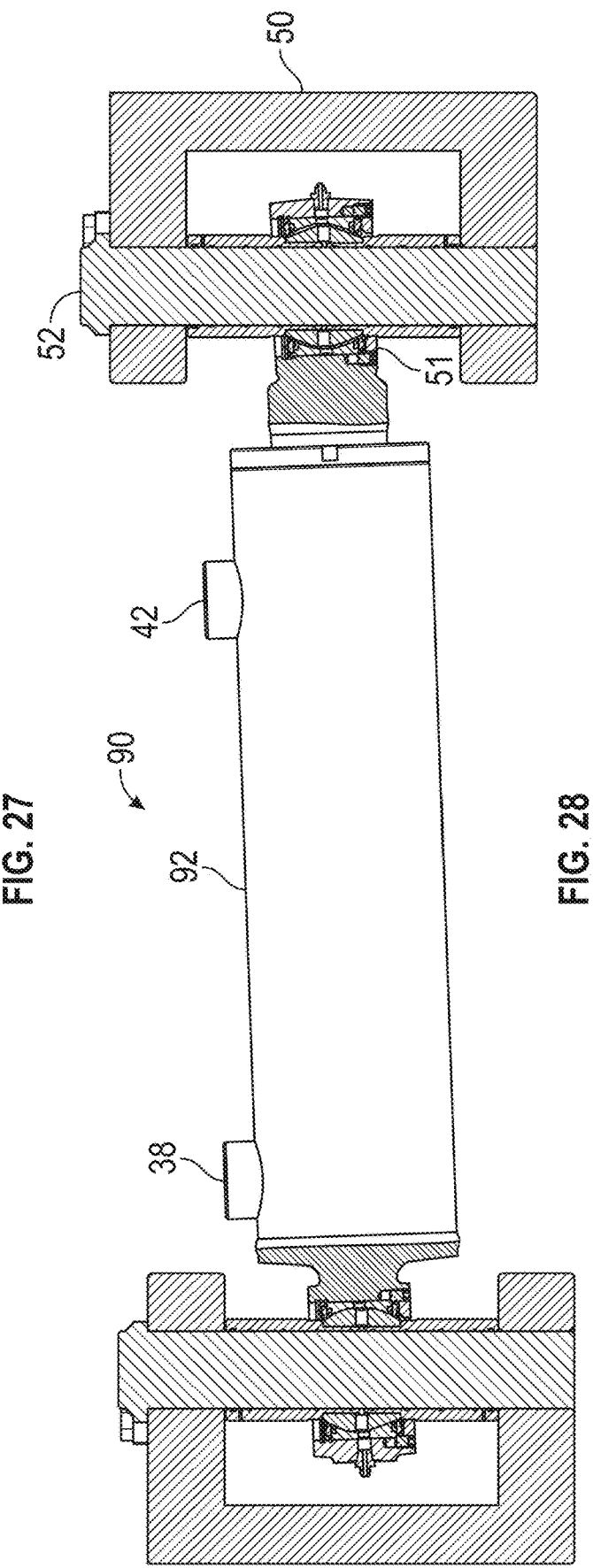
FIG. 28 is a view similar to FIG. 27, showing cross-sectional views of the mounts at the ends of the hydraulic cylinder.
Figure 29A:
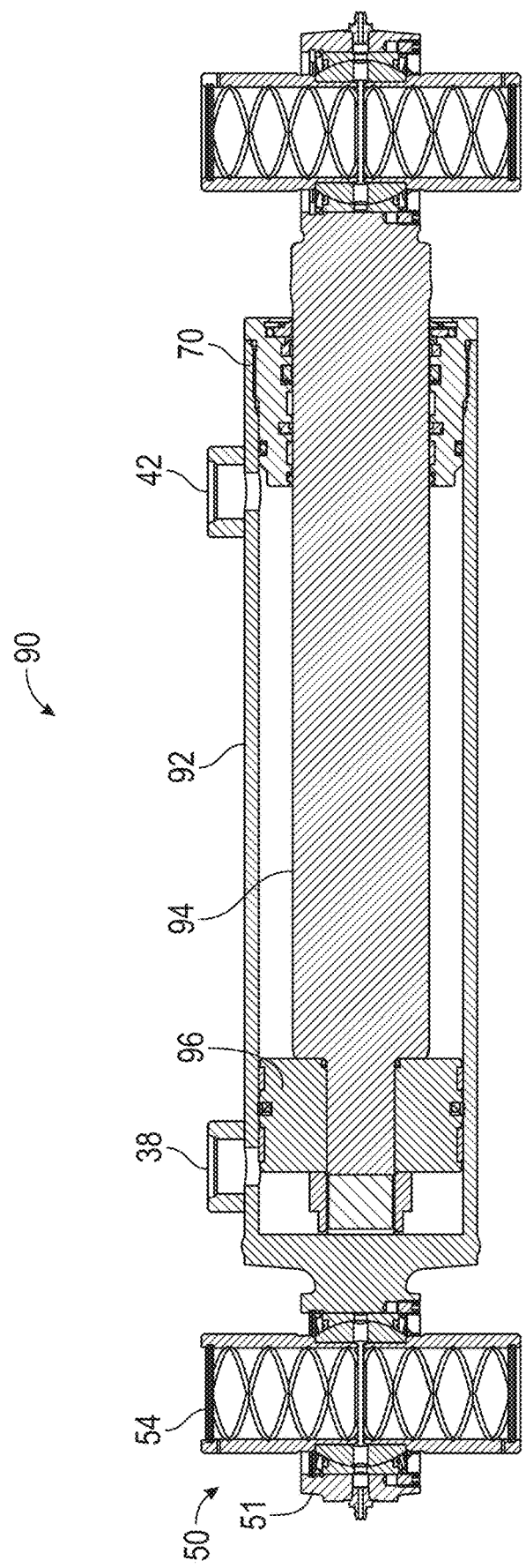
FIG. 29A is a sectional view of a cylinder similar to that shown in FIG. 27.
Figure 29B:
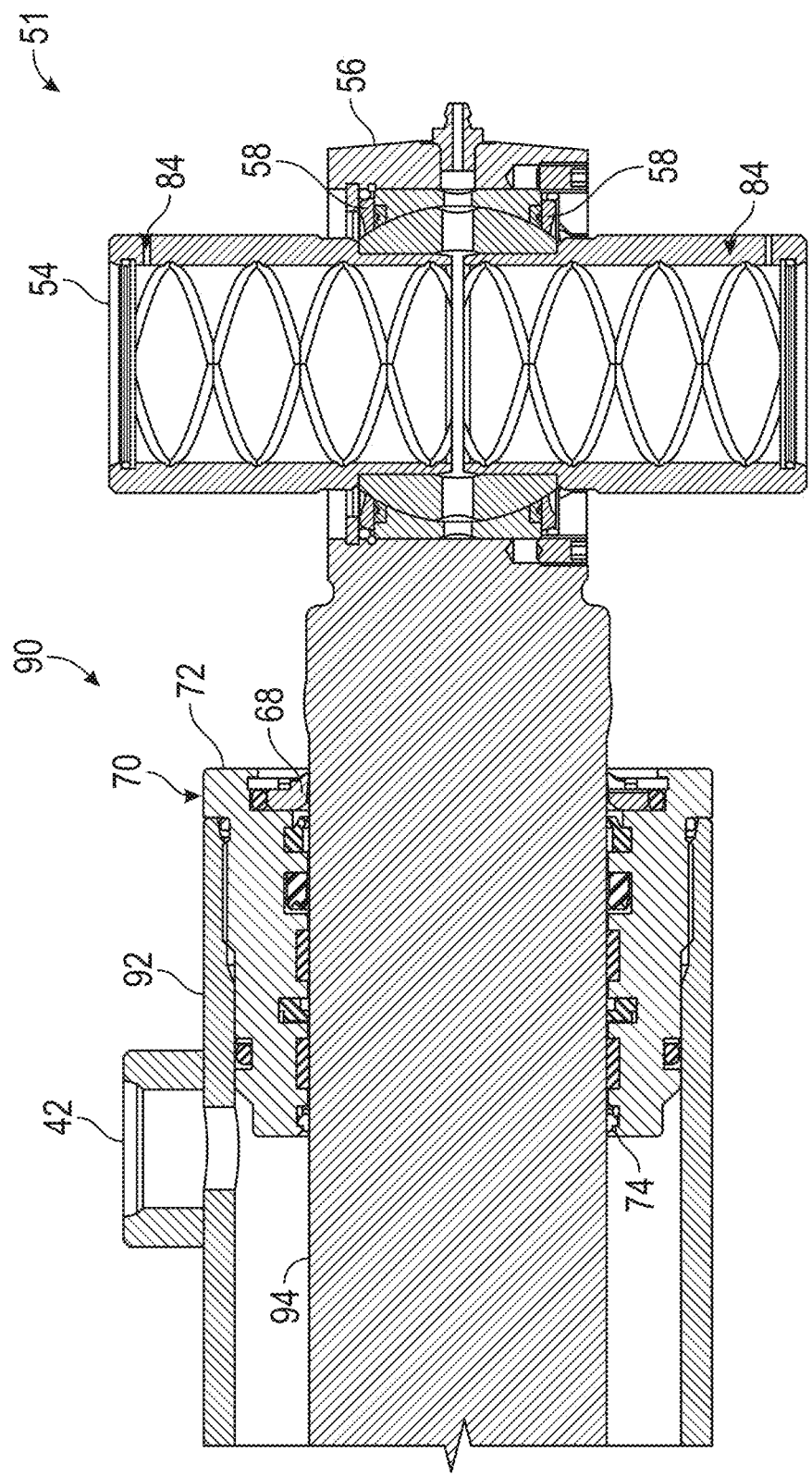
FIG. 29B is an enlarged portion of FIG. 29A.

FIGS. 28-29B show additional aspects including a regular or non-telescoping cylinder 90. As shown in the figures, the cylinder 90 can still include the end mounts 50 with pin connections 52, and which also include the bearing assembly 51 with scrapers 58 as has been disclosed herein.

In addition, as there is a single stage with the cylinder 90, there will be a single rod 94 and piston 96 inside the cylinder housing 92. An oil extension port 38 provides oil directly to and from the extension side of the piston 96, while the retraction port 42 is in direction communication with the retraction side of the piston 96 to provide and remove oil therefrom.

Opposite the piston 96 and basically as a cap for the cylinder 90 is a gland assembly 70. The gland assembly 70 is shown in greater detail in FIG. 29B and is similar to that previous shown in both exploded and non-exploded views in the multi-stage cylinder 10 of the present disclosure. For example, an example gland assembly 70, which may be used in any of the aspects and/or embodiments disclosed herein, is shown in exploded view in FIG. 31. Therefore, the gland assembly 70 will include many of the same seals, O-rings, wear bands, and retaining rings as has been previously disclosed. For example, moving from left to right in FIG. 31, the gland assembly 70 includes an O-ring 76 and backup ring, a head gland 72, an internal rod scraper 74, another O-ring 76, a wear band 48, a rod buffer seal 80, another wear band 48, a rod seal 80, a rod wiper 82, another O-ring 76, an external rod scraper 68, and a spiral retaining ring 78.

As shown best in FIG. 29B, the gland assembly includes a first metallic rod scraper 68. Metallic rod scrapers are often used to protect the rod seals from damage of debris. These scrapers 68 are used on the outside of the cylinder in front of the cylinder wiper 82 and rod seals to prevent the debris from coming into the cylinder. However, in the case of very sticky substances, these scrapers cannot always remove all of the material and the stuck material will cycle in and out of the cylinder, damaging seals.

For example, cylinders such as the telescoping cylinder 10 and regular cylinder 90 may be used in environments that have very sticky materials that stick to the cylinder rod. Typically, these are refuse applications, but it can be other applications like tree harvesting that has tree sap present, or asphalt road paving. In the case of refuse, there are sometimes very sticky substances in the trash that can adhere to the rod very well. One characteristic that is common with these sticky materials is they will often soften while soaking in hydraulic oil when the cylinder is allowed to stay retracted for a period of time. When the materials are softened, then when the cylinder is extended, the material can be scraped off by the rod seals and embed in the seals and seal grooves, which damages the seals and reduces the life of the seals and thus, cylinders.

Figure 30:
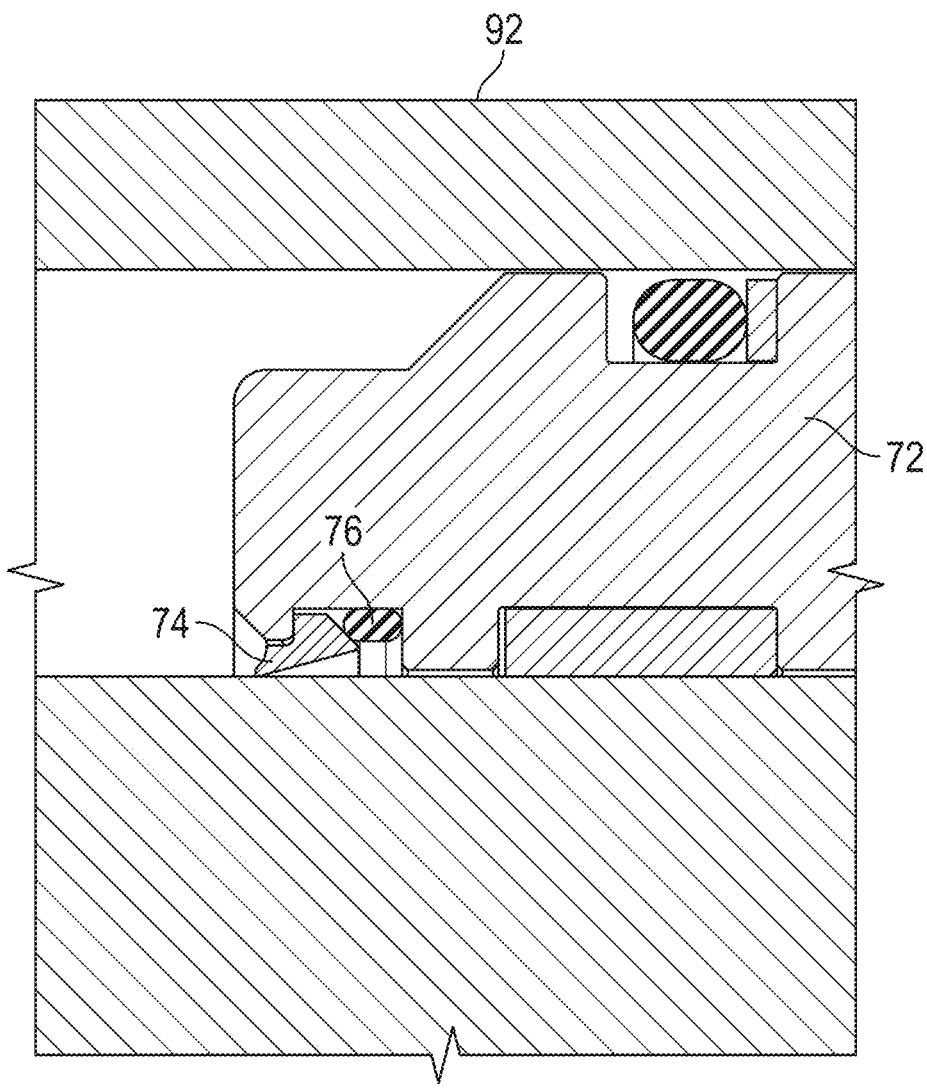
FIG. 30 is an enlarged portion of the sectional view of FIG. 29B.

Therefore, an additional aspect and/or embodiment of the present disclosure is a second metallic scraper 74 that is placed on the inside of the head gland 72 so that the sticky substances can be scraped into the oil in these cases. The debris can then be filtered out of the oil through the standard hydraulic system filters that the cylinder is connected to. Being on the inside of the cylinder head gland 72, this scraper 74 is low profile to fit in the reduce cross-section area (see, e.g., FIG. 30). The scraper 74 is split with a cut in the scraper ring and is packaged with an O-ring 76 loading the scraper into the rod. To install, the O-ring is placed in the groove, then the scraper is snapped in place since it can reduce in diameter due to a split cut into it. When the gland is installed on the cylinder rod, the scraper 74 is held in place in the groove.

As shown, the metallic scrapers 74 may be metallic rings or ring-like members that include an edge or surface that is in contact or close contact with the rods to remove unwanted debris therefrom. The exact shape or configuration of the edge of the scraper should not be limiting, as generally any configuration capable of removing debris would suffice. In addition, while a metallic ring may be preferred in some embodiments, it should be appreciated that the scraper comprise generally any rigid material capable of removing debris and also standing up to the wear and tear of use.

Figure 31:
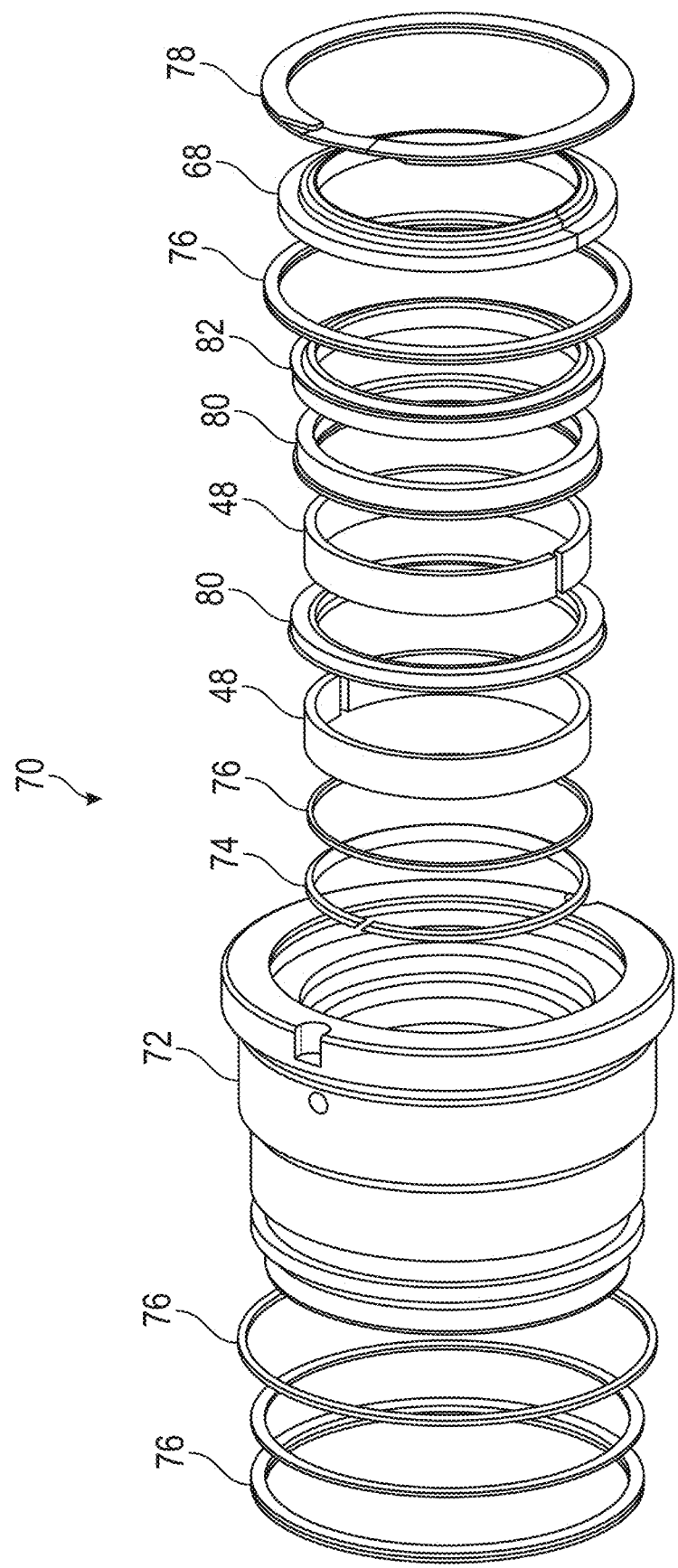
FIG. 31 is an exploded view of a scraper assembly used with a cylinder such as that shown in FIG. 29A.

See also FIG. 31, which shows an exploded view of the gland assembly 70 with both the first metallic scraper 68 on the outside of the cylinder 90, and the second metallic scraper 74, which includes the split cut, and which will further remove unwanted debris (e.g., sticky substances) from the rod. The figure also shows the location of the O-ring 76 adjacent the second scraper 74, which is shown in enlarged FIG. 30. Again, as noted, the use of the internal scraper 74 can be used in a gland assembly 70 for any type of hydraulic cylinder, including a standard single stage cylinder 90 or a telescopic multi-stage cylinder, such as the cylinder 10 shown and described herein.

Therefore, improvements to hydraulic cylinder, including both singe stage and multi-stage, have been shown and described. As noted, the aspects and/or embodiments disclosed should not be limited to that specifically shown in the figures, and it should be further appreciated that any of the elements of any of the figures or descriptions thereof could be combined with any of the elements of any of the other figures or descriptions thereof to create additional aspects and/or embodiments not explicitly described herein.

It should be noted that any of the cylinders shown and/or described can be plated with cobalt and/or a cobalt mixture (i.e., cylinders can be cobalt plated), but this is not a requirement for any of the aspects of any of the embodiments disclosed herein. This relates to any of the components of any of the cylinders.

From the foregoing, it can be seen that the invention accomplishes at least all of the stated objectives. This includes, but is not limited to, extending the life of hydraulic cylinders and components thereof, reducing the chance of mis-staging for multi-stage, telescoping cylinders, providing increased use and flexibility for hydraulic cylinders, such as by increased flexibility in mounting, and improved efficiency and ease for the changing of components. While this is not to be considered an exhaustive list of the objectives, it should be appreciated that these improvements improve on and provide advantages over cylinders currently known.

The invention claimed is:

1. An end mount for use with a hydraulic cylinder, comprising:
    an end mount housing comprising a plurality of scallops cut into the housing;
    a bearing member positioned in the housing and connected to the cylinder to allow movement thereof, wherein the bearing member comprises a spherical bearing and an outer race surrounding the spherical bearing; and
    at least one metallic scraper positioned between the bearing member and the housing to mitigate material from building up on the bearing member and to protect seals adjacent the at least one metallic scraper,
    wherein the at least one metallic scraper comprises a circular shaped member that is positioned fully externally and surrounding the outer race of the bearing member; and
    wherein the plurality of scallops allow debris to evacuate away from the scrapers.

2. The end mount of claim 1, further comprising a pin operatively connected between the bearing member and the cylinder to provide connection therebetween.

3. The end mount of claim 1, further comprising a sleeve bushing through the spherical bearing.

4. The end mount of claim 3, wherein the at least one metallic scraper is in communication with said outer race.

5. The end mount of claim 3, wherein the spherical bearing is held in place with a metallic retaining ring and screws.

6. The end mount of claim 3, wherein the at least one metallic scraper comprises first and second metallic scrapers positioned on opposite sides of the spherical bearing.

7. The end mount of claim 1, further comprising a second bearing member positioned in the housing, said second bearing member comprising a sleeve bushing interior of the bearing member.

8. The end mount of claim 1, wherein the spherical bearing at least partially surrounds a sleeve bushing.

9. The end mount of claim 8, wherein the sleeve bushing comprises a cylinder.

10. The end mount of claim 9, wherein the cylindrical sleeve bushing is positioned relative to the end mount housing in a symmetrical manner.

11. A hydraulic cylinder assembly, comprising:
a telescoping, multi-stage hydraulic cylinder; and
an end mount at each end of the telescoping, multi-stage hydraulic cylinder, the end mount comprising,
an end mount housing comprising a plurality of scallops cut into the end mount housing;
a bearing member positioned in the housing and connected to the cylinder to allow movement thereof, wherein the bearing member comprises a spherical bearing and an outer race surrounding the spherical bearing; and
at least one metallic scraper comprising a circular shaped member that is positioned between the bearing member and the housing to mitigate material from building up on the bearing member, the at least one metallic scraper positioned fully externally of the outer race of the bearing member;
wherein the plurality of scallops allow debris to evacuate away from the scrapers.

12. The hydraulic cylinder assembly of claim 11, further comprising a pin operatively connected between the bearing member and the cylinder to provide connection therebetween.

13. The hydraulic cylinder assembly of claim 11, wherein the at least one metallic scraper is in communication with said outer race.

14. The hydraulic cylinder assembly of claim 11, wherein the at least one metallic scraper comprises first and second scrapers positioned on opposite sides of the spherical bearing.

15. The hydraulic cylinder assembly of claim 11, wherein the telescoping, multi-stage hydraulic cylinder comprises three stages of extension and retraction.

16. The hydraulic cylinder assembly of claim 11, further comprising a bushing operatively connected to the end mount.

17. A hydraulic cylinder assembly, comprising:
a hydraulic cylinder; and
an end mount at each end of the telescoping, multi-stage hydraulic cylinder, the end mount comprising,
an end mount housing comprising a plurality of scallops cut into the end mount housing;
a bearing member positioned in the housing and connected to the cylinder to allow movement thereof, wherein the bearing member comprises a spherical bearing and an outer race surrounding the spherical bearing;
at least one metallic scraper comprising a circular shaped member that is positioned between the bearing member and the housing to mitigate material from building up on the bearing member, the at least one metallic scraper positioned fully externally of the outer race of the bearing member; and
a bushing operatively connected to the end mount;
wherein the plurality of scallops allow debris to evacuate away from the scrapers.

18. The hydraulic cylinder assembly of claim 17, wherein the end mount comprises a plurality of metallic scrapers at opposite ends of the bearing member.

* * * * *